US012266848B2

(12) United States Patent
Wu et al.

(10) Patent No.: US 12,266,848 B2
(45) Date of Patent: Apr. 1, 2025

(54) ANTENNA APPARATUS AND ELECTRONIC DEVICE

(71) Applicant: Huawei Technologies Co., Ltd., Shenzhen (CN)

(72) Inventors: Pengfei Wu, Shanghai (CN); Hanyang Wang, Reading (GB); Dong Yu, Shanghai (CN)

(73) Assignee: HUAWEI TECHNOLOGIES CO. , LTD., Shenzhen (CN)

( * ) Notice: Subject to any disclaimer, the term of this patent is extended or adjusted under 35 U.S.C. 154(b) by 383 days.

(21) Appl. No.: 17/780,857

(22) PCT Filed: Nov. 27, 2020

(86) PCT No.: PCT/CN2020/132206

§ 371 (c)(1),
(2) Date: May 27, 2022

(87) PCT Pub. No.: WO2021/104447

PCT Pub. Date: Jun. 3, 2021

(65) Prior Publication Data

US 2023/0006333 A1 Jan. 5, 2023

(30) Foreign Application Priority Data

Nov. 28, 2019 (CN) ......................... 201911192854.3
Jan. 22, 2020 (CN) ......................... 202010075891.2

(51) Int. Cl.
*H01Q 1/24* (2006.01)
*H01Q 1/36* (2006.01)
*H01Q 1/48* (2006.01)
*H01Q 1/50* (2006.01)
*H01Q 5/20* (2015.01)
(Continued)

(52) U.S. Cl.
CPC ............... *H01Q 1/243* (2013.01); *H01Q 1/36* (2013.01); *H01Q 1/48* (2013.01); *H01Q 1/50* (2013.01);
(Continued)

(58) Field of Classification Search
CPC ............ H01Q 1/243; H01Q 1/36; H01Q 1/48; H01Q 1/50; H01Q 5/20; H01Q 5/335;
(Continued)

(56) References Cited

U.S. PATENT DOCUMENTS 10,567,561 B2 * 2/2020 Kang ..................... H05K 5/069
11,342,651 B2 * 5/2022 Ma ......................... H01Q 13/10
(Continued)

FOREIGN PATENT DOCUMENTS

CN 106229624 A 12/2016
CN 106571516 A 4/2017
(Continued)

OTHER PUBLICATIONS

Choi et al. "High-Efficiency Crossed-Loop 4G LTE Antenna for All Display Metal-Rimmed Smartphones", International Journal of Antennas and Propagation, vol. 2018, Aug. 28, 2018 (Aug. 28, 2018), Article ID 8070953, 7 pages https://doi.org/10.1155/2018/8070953 (Year: 2018) (Year: 2018).*

*Primary Examiner* — Seung H Lee
(74) *Attorney, Agent, or Firm* — Conley Rose, P.C.

(57) ABSTRACT

In an antenna design, a metal frame of an electronic device and a printed circuit board (PCB) form a slot antenna radiator, where two common mode (CM) slot antenna modes of the slot antenna radiator are excited through anti-symmetrical feeding, so that when dual resonances and wide-band coverage are implemented, specific absorption ratio (SAR) values in the two CM slot antenna modes are close.

19 Claims, 33 Drawing Sheets

(51) Int. Cl.
*H01Q 5/335* (2015.01)
*H01Q 13/08* (2006.01)
*H01Q 13/10* (2006.01)

(52) U.S. Cl.
CPC ............... *H01Q 5/20* (2015.01); *H01Q 5/335* (2015.01); *H01Q 13/08* (2013.01); *H01Q 13/10* (2013.01)

(58) Field of Classification Search
CPC .......... H01Q 13/08; H01Q 13/10; H01Q 1/52; H01Q 7/00; H01Q 1/242
See application file for complete search history.

(56) References Cited

U.S. PATENT DOCUMENTS

| | | | | |
|---|---|---|---|---|
| 11,626,662 | B2 * | 4/2023 | Xue | H01Q 5/335 343/702 |
| 2015/0109168 | A1 * | 4/2015 | Chang | H01Q 5/371 343/700 MS |
| 2015/0188212 | A1 | 7/2015 | Tseng et al. | |
| 2016/0079652 | A1 | 3/2016 | Gu et al. | |
| 2017/0054200 | A1 | 2/2017 | Kang et al. | |
| 2018/0083344 | A1 | 3/2018 | Han et al. | |
| 2018/0123234 | A1 | 5/2018 | Wang et al. | |
| 2018/0233807 | A1 * | 8/2018 | Ma | H01Q 21/0075 |
| 2020/0099125 | A1 | 3/2020 | Ying et al. | |

FOREIGN PATENT DOCUMENTS

| | | | |
|---|---|---|---|
| CN | 107039766 | A | 8/2017 |
| CN | 107871932 | A | 4/2018 |
| CN | 108713277 | A | 10/2018 |
| CN | 110137664 | A | 8/2019 |
| CN | 110165373 | A | 8/2019 |
| CN | 110350294 | A | 10/2019 |
| EP | 3293819 | A1 | 3/2018 |
| EP | 3883061 | A1 | 9/2021 |

* cited by examiner

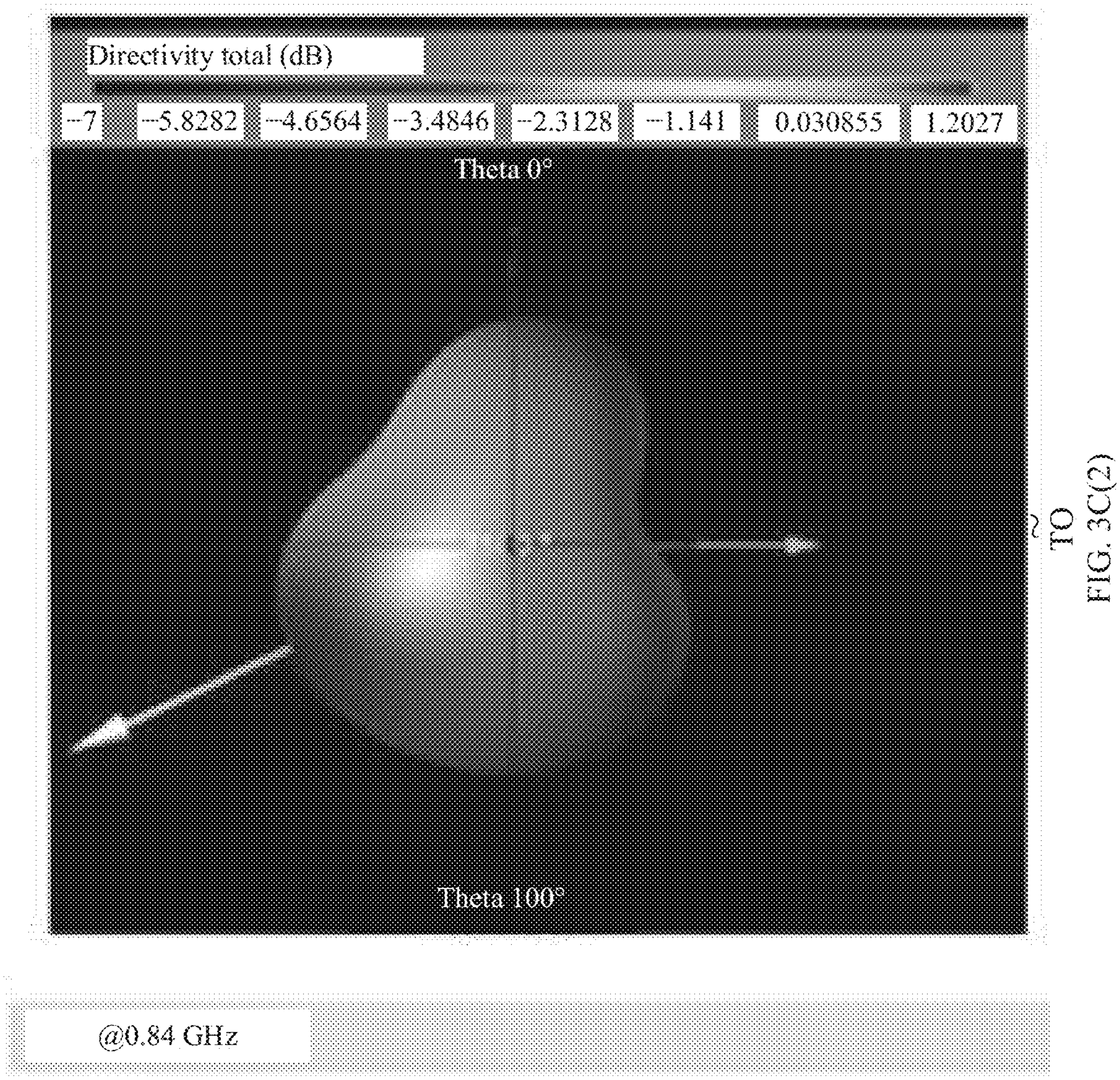
TO FIG. 3C(2)
FIG. 3C(1)

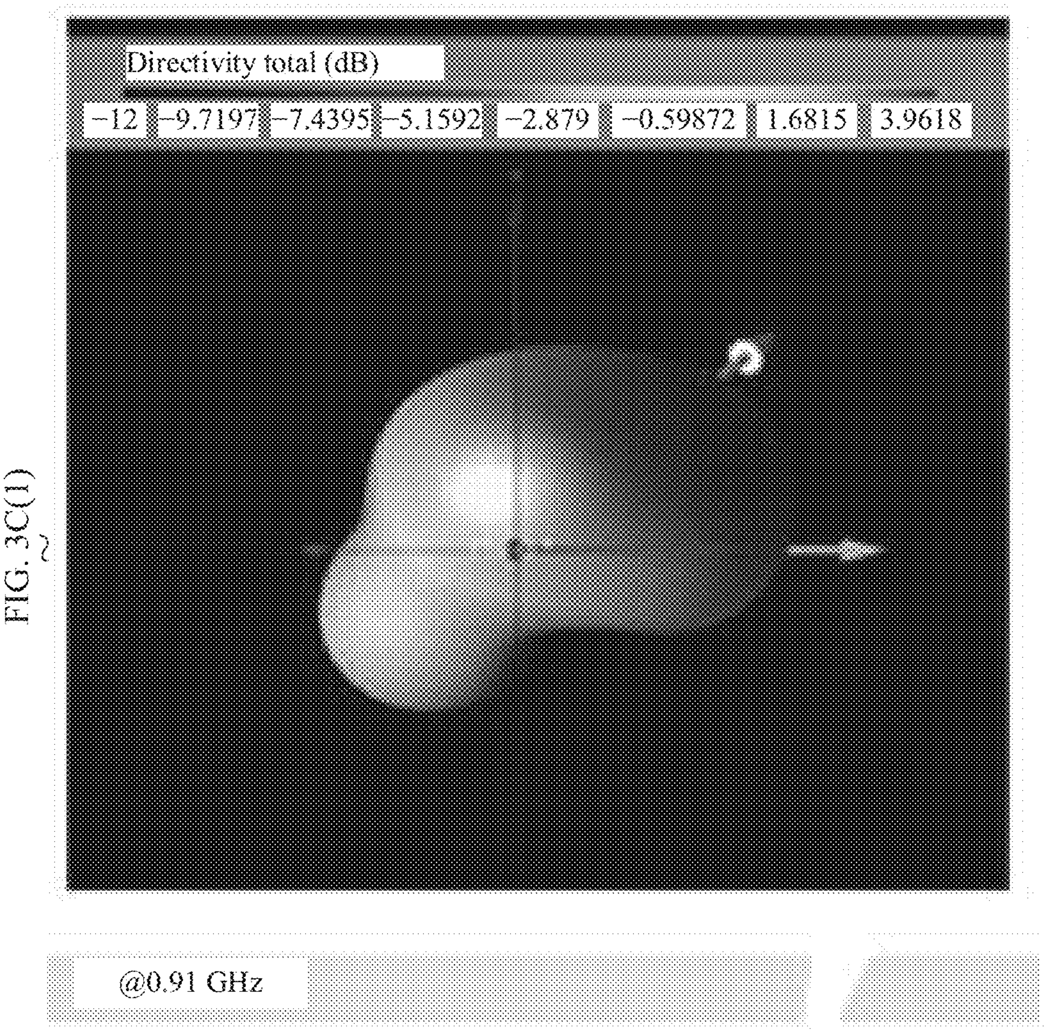
CONT. FROM FIG. 3C(1)
FIG. 3C(2)

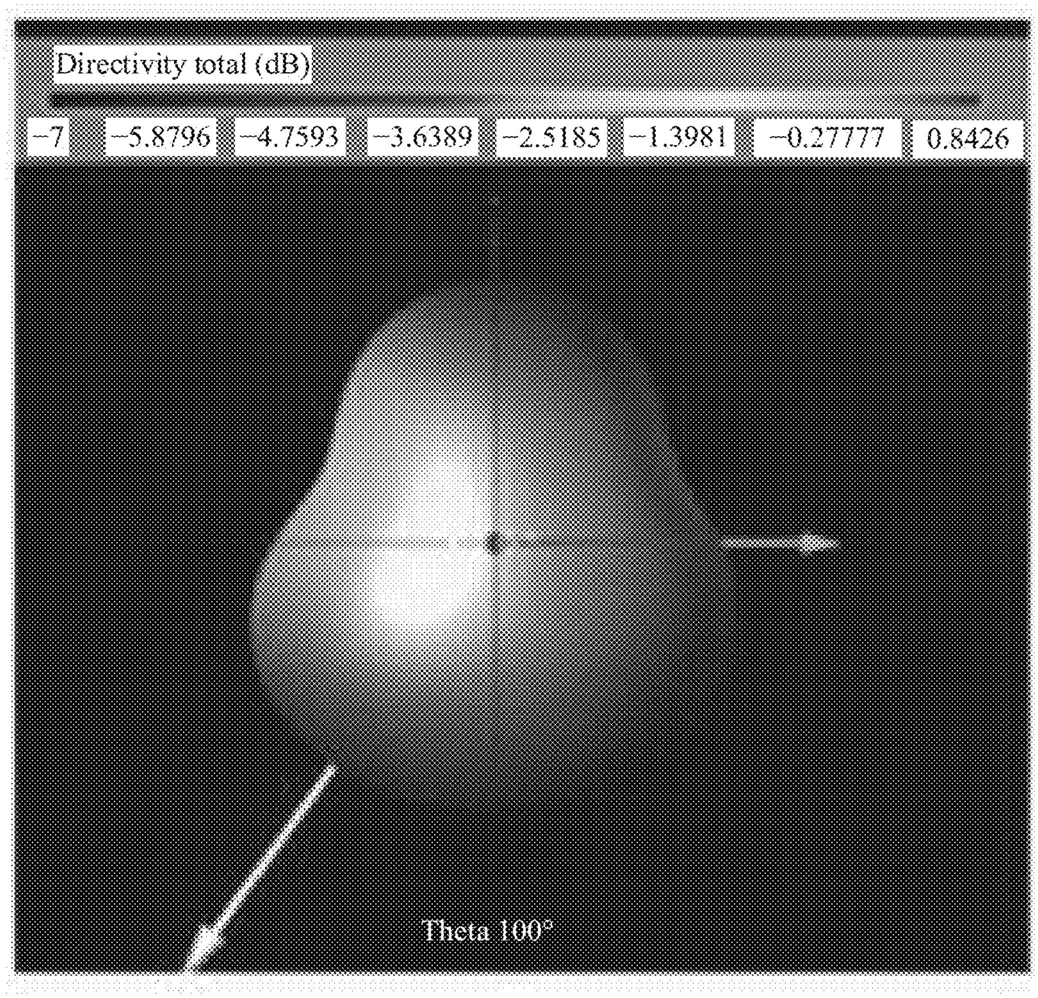
TO FIG. 10B(2)
@0.82 GHz
FIG. 10B(1)

CONT. FROM FIG. 10B(1)
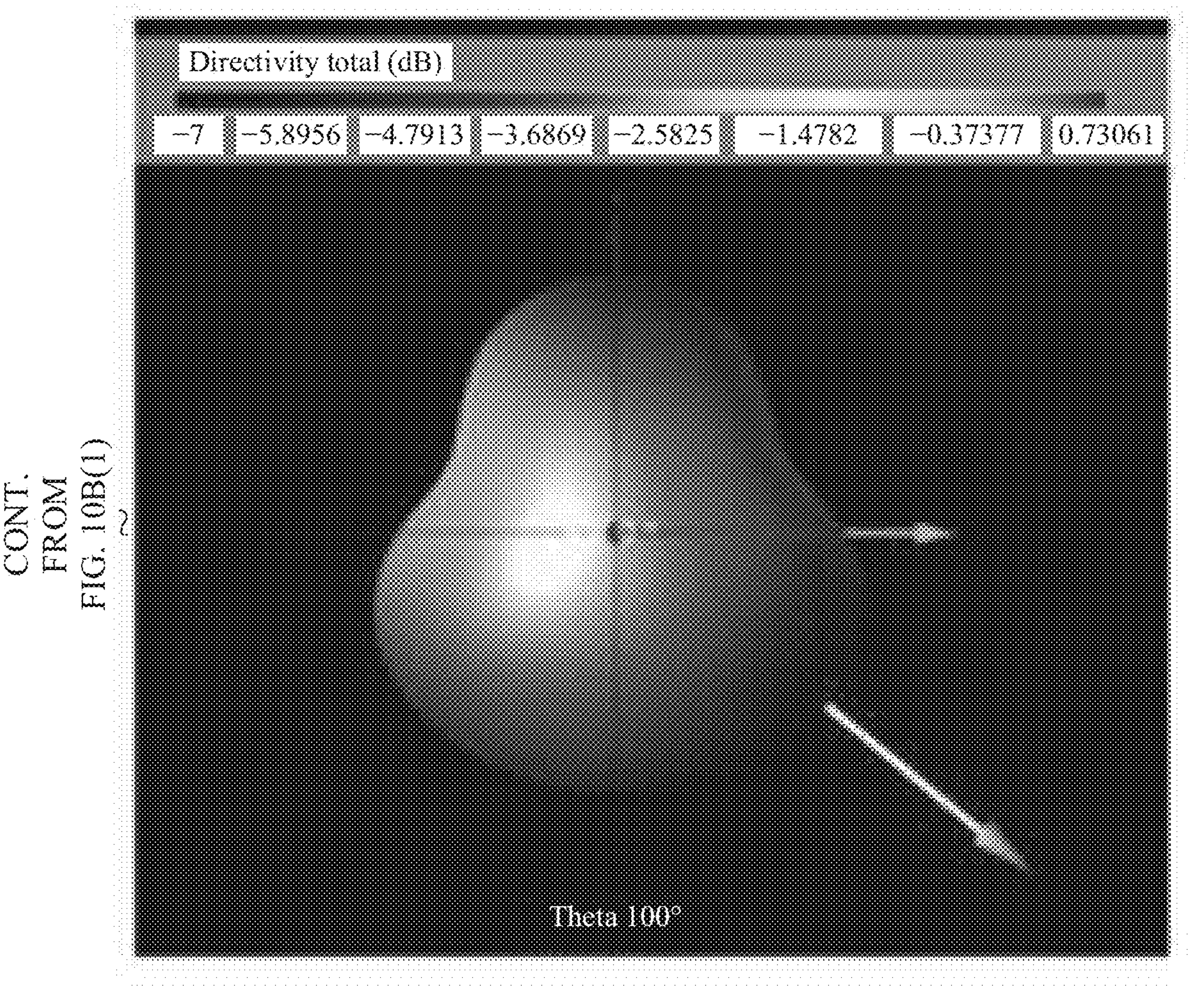
@0.87 GHz
FIG. 10B(2)

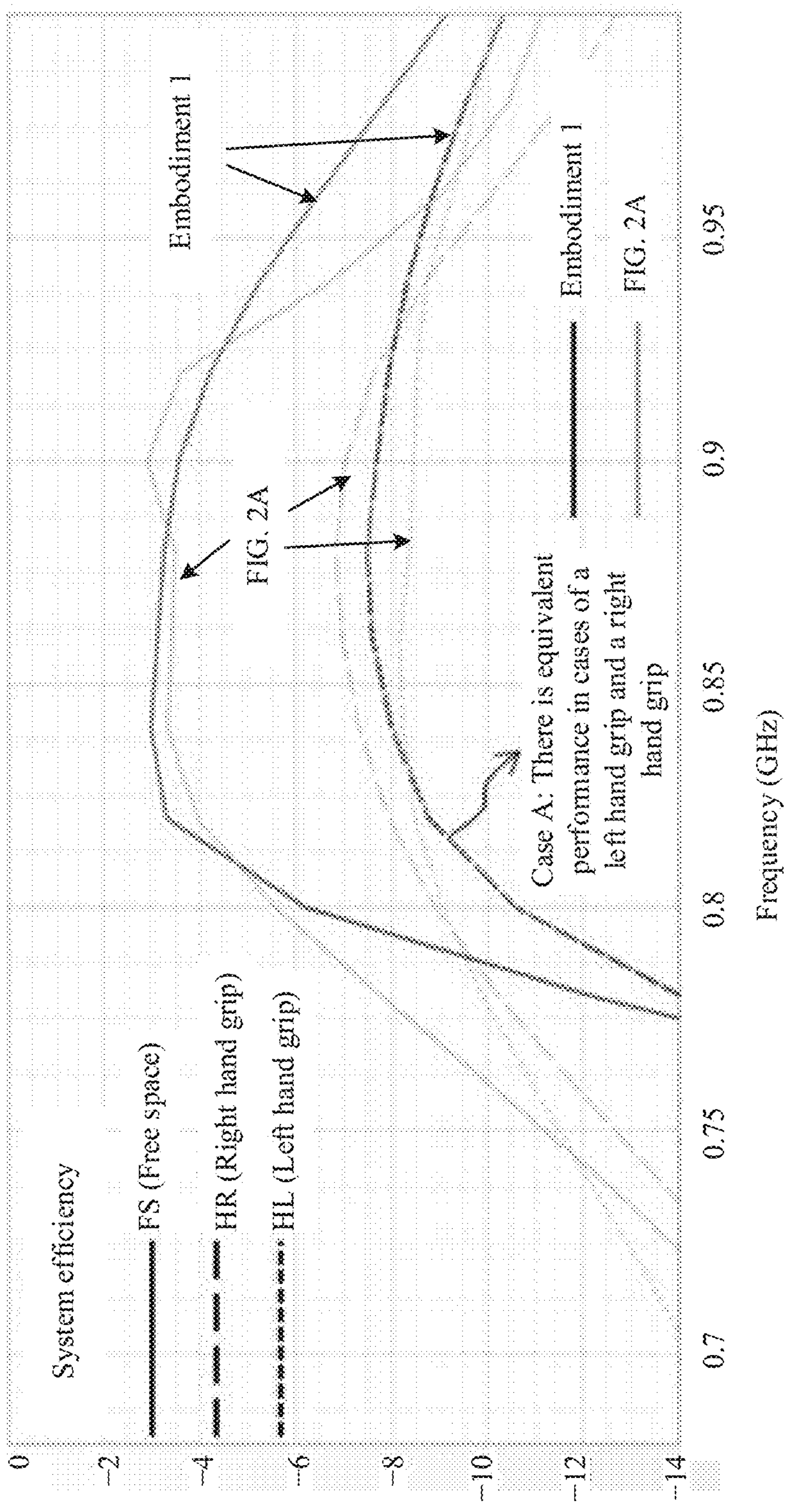
~
TO
FIG. 10C(2)
FIG. 10C(1)

CONT. FROM FIG. 10C(1)
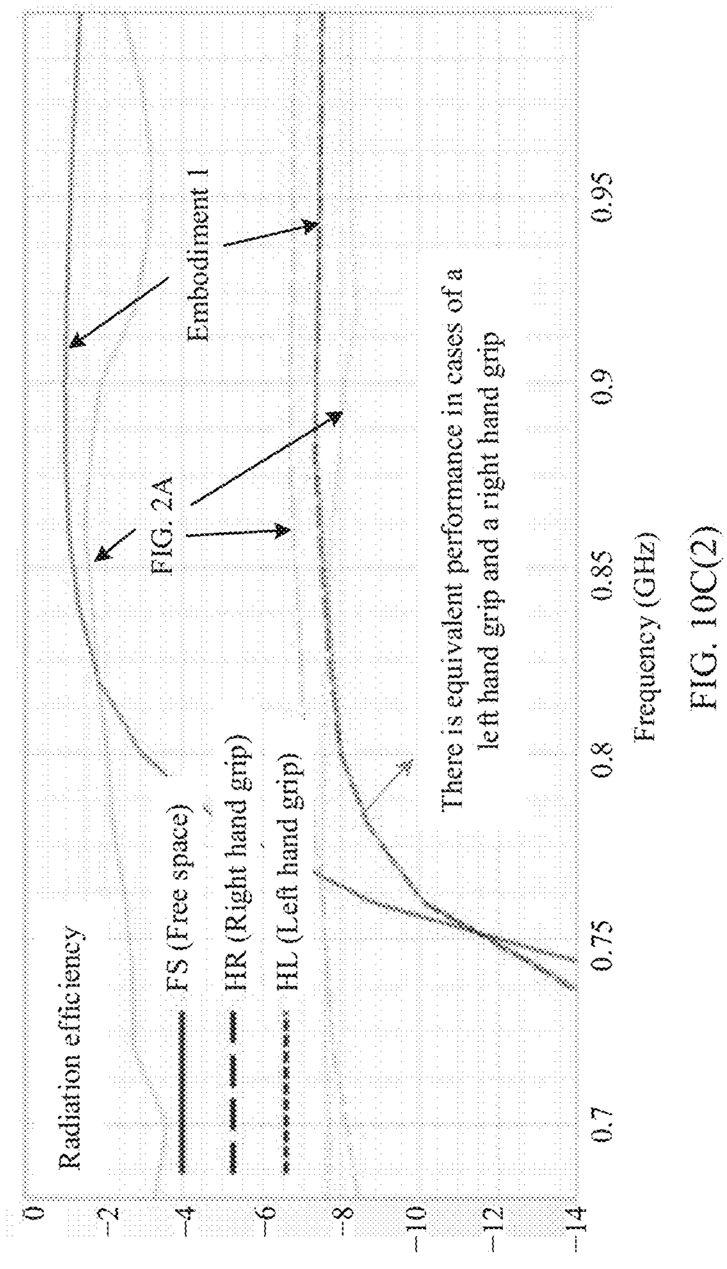
FIG. 10C(2)

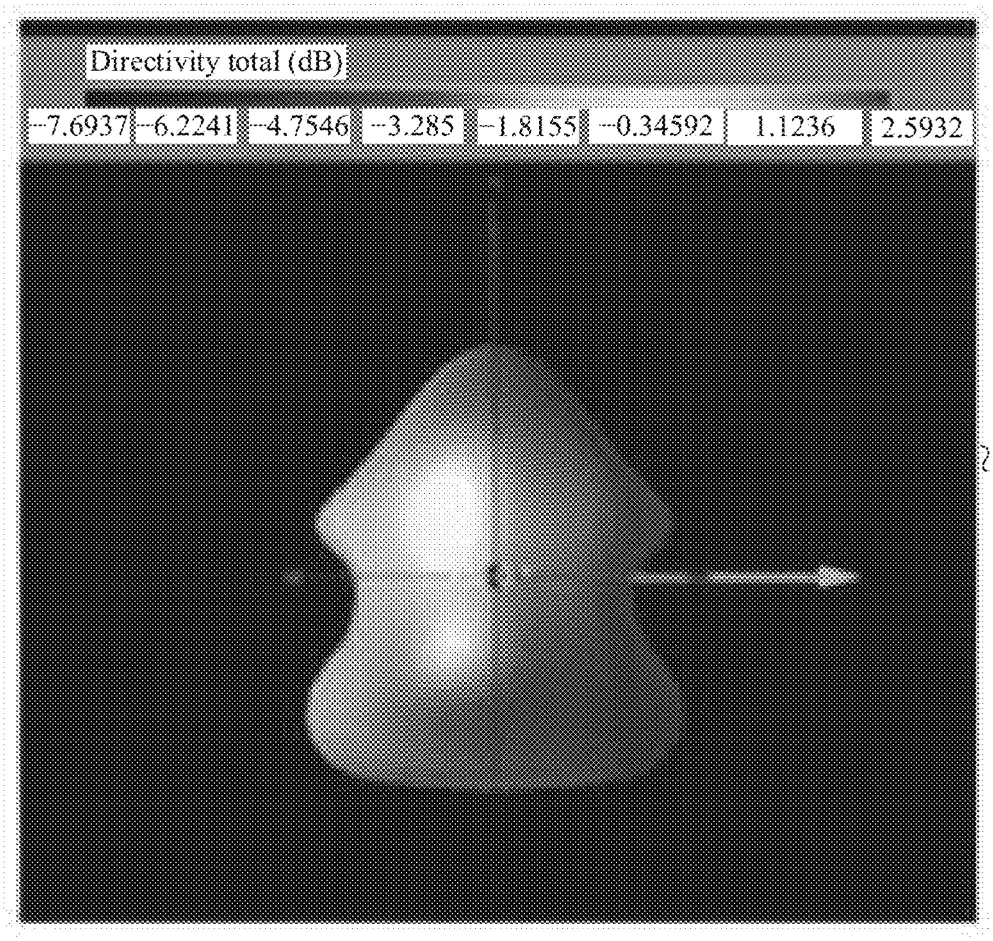
TO FIG. 13B(2)
FIG. 13B(1)

CONT. FROM FIG. 13B(1)
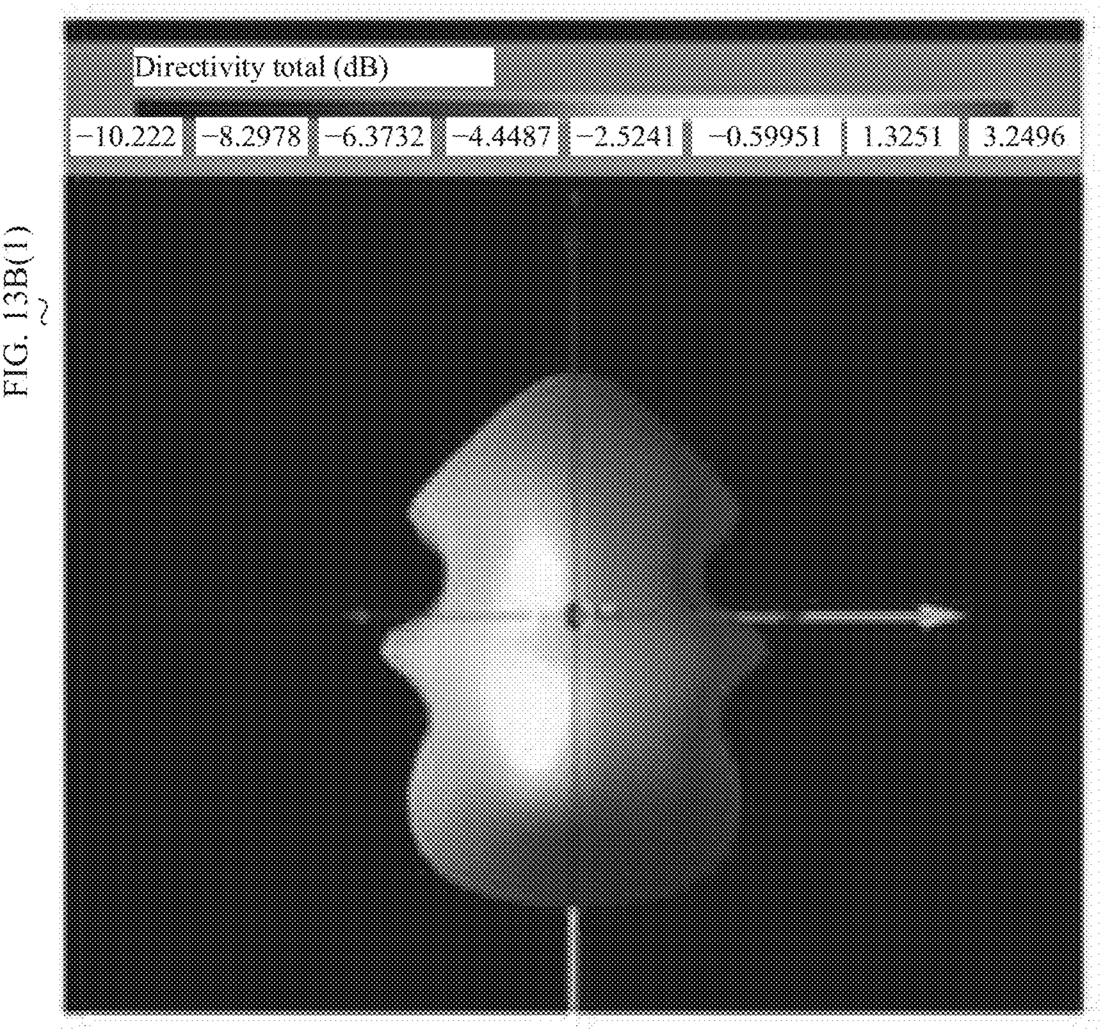
@2.46 GHz
FIG. 13B(2)

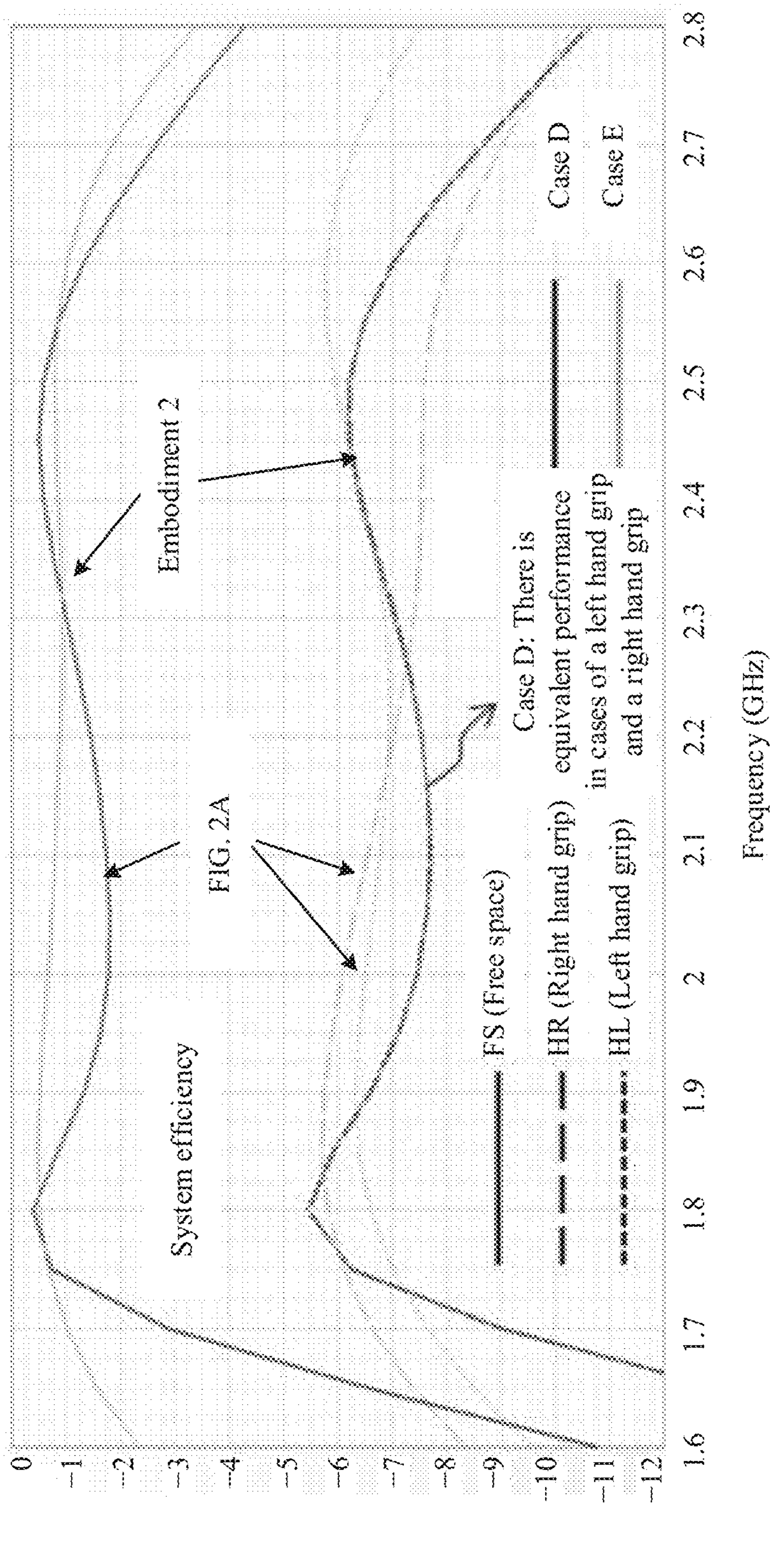
~
TO
FIG. 13C(2)
FIG. 13C(1)

CONT.
FROM
FIG. 13C(1)
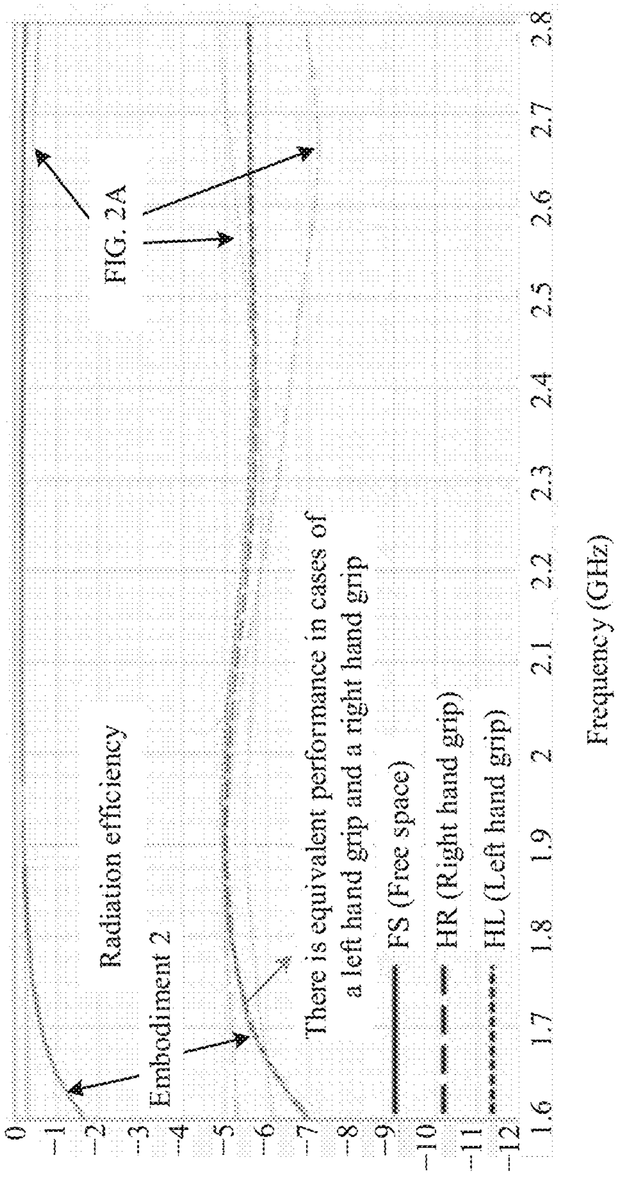
FIG. 13C(2)

ANTENNA APPARATUS AND ELECTRONIC DEVICE

CROSS-REFERENCE TO RELATED APPLICATIONS

This is a U.S. National Stage of International Patent Application No. PCT/CN2020/132206 filed on Nov. 27, 2020, which claims priority to Chinese Patent Application No. 202010075891.2 filed on Jan. 22, 2020 and Chinese Patent Application No. 201911192854.3 filed on Nov. 28, 2019, all of which are hereby incorporated by reference in their entireties.

TECHNICAL FIELD

The present invention relates to the field of antenna technologies, and in particular, to an antenna apparatus applied to an electronic device.

BACKGROUND

A multiple-input multiple-output (multi-input multi-output, MIMO) technology plays a very important role in a 5th generation (5th generation, 5G) wireless communications system. However, it is still a big challenge that an electronic device, for example, a mobile phone, obtains good MIMO performance. One reason is that the very limited space inside the electronic device limits a frequency band that can be covered by a MIMO antenna and high performance.

In addition, with development of the mobile internet, there are more user use scenes of the electronic device, for example, a call scene, a landscape/portrait game scene, a landscape video and audio scene, and a portrait internet surfing scene. In different user use scenes, a posture in which a user grips the electronic device, for example, the mobile phone changes. It is also an important problem of equalizing antenna performance in cases of a left hand grip and a right hand grip in different user use scenes.

SUMMARY

Embodiments of the present invention provide an antenna apparatus, to implement a wideband antenna design in which two resonant modes of a slot antenna are both a common mode. There is a same radiation pattern, performance in a case of a left hand grip and performance in a case of a right hand grip are equivalent, and SAR values in the two modes are close.

According to a first aspect, an embodiment of this application provides an electronic device. The electronic device includes a PCB, a metal frame, and an antenna apparatus. The antenna apparatus may include a slot, a first feeding point, a second feeding point, and a bridge structure.

The slot may be disposed between the PCB and a first section of the metal frame. Two ends of the slot may be grounded. The slot may include a first side edge and a second side edge, the first side edge may consist of one side edge of the PCB, and the second side edge may consist of the first section of the metal frame. A slit may be disposed on the second side edge. The second side edge may include a first part and a second part, the first part may be located on one side of the slit, and the second part may be located on the other side of the slit.

The first feeding point may be located on the first part of the second side edge, and the second feeding point may be located on the second part of the second side edge. The first feeding point may be connected to a positive electrode of a feeding source of the antenna apparatus, and the second feeding point may be connected to a negative electrode of the feeding source of the antenna apparatus.

The bridge structure may include a first end and a second end, the first end may be connected to the first part or extend to the slot over the first side edge, and the second end may be connected to the second part or extend to the slot over the first side edge.

In the first aspect, a feeding structure including the first feeding point and the second feeding point may excite the slot to generate a CM slot antenna mode. Such a feeding structure is anti-symmetrical feeding in the following embodiments. A current and an electric field in the CM slot antenna mode are distributed with the following features: The current is distributed in a same direction on two sides of the slit, but the electric field is distributed in opposite directions on the two sides of the slit. The current and the electric field in the CM slot antenna mode may be generated when parts of the slot that are on the two sides of the slit separately operate in a ¼ wavelength mode.

In comparison with a slot antenna in a conventional feeding manner, in an antenna design solution used for the electronic device provided in the first aspect, efficiency in a case of a left hand grip and efficiency in a case of a right hand grip may be basically the same in a portrait-mode grip scenario.

With reference to the first aspect, in some embodiments, the first feeding point and the second feeding point may be connected to a feeding network of the feeding source, and the feeding network may include two symmetrical parallel conducting wires that are formed by hollowing out a ground plane of the PCB and that extend from the ground plane.

With reference to the first aspect, in some embodiments, the bridge structure may be a metal support of a laser direct structure LDS, and may be mounted on a back side of a PCB 17. The bridge structure may be used to optimize impedance matching. In two sides of the PCB 17, a side on which the ground plane of the PCB is disposed may be referred to as a front side of the PCB, and the other side (on which no ground plane of a PCB is disposed) may be referred to as a back side of the PCB.

With reference to the first aspect, in some embodiments, the slit may be disposed at a middle location of the second side edge, or may be disposed away from the middle location.

With reference to the first aspect, in some embodiments, the slot may be a U-shaped slot. For example, the slot may extend from a bottom edge of the metal frame to two side edges of the metal frame, and may be a U-shaped slot located at a bottom of the electronic device. Similarly, the slot may alternatively be a U-shaped slot located at a top of the electronic device, or a U-shaped slot on a side edge of the electronic device.

With reference to the first aspect, in some embodiments, the slot may be an L-shaped slot. For example, the slot may extend from a bottom edge of the metal frame to one side edge of the metal frame, and may be an L-shaped slot located on a left side or a right side of a bottom of the electronic device. Similarly, the slot may alternatively be an L-shaped slot located at a top of the electronic device.

With reference to the first aspect, in some embodiments, an arrangement location of the antenna apparatus in the electronic device may be one or more of the following: a bottom of the electronic device, a top of the electronic device, or a side edge of the electronic device.

With reference to the first aspect, in some embodiments, the electronic device may include a plurality of antenna apparatuses, and the plurality of antenna apparatuses may be arranged at a plurality of locations at the top, at the bottom, or on the side edge of the electronic device. For example, if the electronic device includes two antenna apparatuses, the two antenna apparatuses may be respectively arranged at the top and the bottom of the electronic device.

With reference to the first aspect, in some embodiments, the first feeding point and the second feeding point may be respectively connected to the positive electrode and the negative electrode of the feeding source by using a coaxial transmission line, the first feeding point is specifically connected to an inner conductor of the coaxial transmission line, and the second feeding point is specifically connected to an outer conductor of the coaxial transmission line.

With reference to the first aspect, in some embodiments, the first feeding point and the second feeding point may be disposed close to the slit, or may be respectively disposed close to the two ends of the slot.

With reference to the first aspect, in some embodiments, a size of the bridge structure is large, and some lumped components (for example, a lumped inductor) may be added to reduce the size. In other words, a part of the bridge structure is a lumped component.

With reference to the first aspect, in some embodiments, the bridge structure is not limited to the LDS metal support mounted on the back side of the PCB. Alternatively, the bridge structure may be formed by hollowing out the ground plane of the PCB.

According to a second aspect, an embodiment of this application provides an electronic device. The electronic device includes a PCB, a metal frame, and an antenna apparatus. The antenna apparatus may include a slot, a first feeding point, a second feeding point, and a bridge structure.

The slot may be disposed between the PCB and a first section of the metal frame, the first section of the metal frame includes a first end and a second end, and two ends of the slot may be grounded. The slot may include a first side edge and a second side edge, the first side edge may consist of one side edge of the PCB, and the second side edge may consist of the first section of the metal frame. A plurality of slits may be disposed on the second side edge. The second side edge may include a first part, a second part, and a third part, the first part may be located on one side of the third part, and the second part may be located on the other side of the third part. The third part may include a first slit, a second slit, and a floating section located between the first slit and the second slit.

The first feeding point may be located on the first part of the second side edge, and the second feeding point may be located on the second part of the second side edge. The first feeding point may be connected to a positive electrode of a feeding source of the antenna apparatus, and the second feeding point may be connected to a negative electrode of the feeding source of the antenna apparatus.

The bridge structure may include a first end and a second end, the first end may be connected to the first part or extend to the slot over the first side edge, and the second end may be connected to the second part or extend to the slot over the first side edge.

It can be learned that, a difference between the second aspect and the first aspect is that there are two slits, the first slit and the second slit on the second side edge in the second aspect. There may be more than two slits. The third part may include three or more slits and a floating section between these slits.

With reference to the second aspect, in some embodiments, the bridge structure may be further connected to the floating section in the third part.

With reference to the second aspect, in some embodiments, the bridge structure may include a T-shaped structure: The bridge structure is connected to a floating metal frame between the slits in addition to parts of the slot that are on two sides of the slits. Specifically, the T-shaped structure may include a transverse branch and a vertical branch, two ends of the transverse branch are respectively the first end and the second end, and are respectively connected to the first part of the second side edge and the second part of the second side edge, and the vertical branch is connected to the floating section.

With reference to the second aspect, in some embodiments, the bridge structure may be a metal support of a laser direct structure LDS, and may be mounted on a back side of the PCB. The bridge structure may be used to optimize impedance matching. In two sides of the PCB, a side on which a ground plane of the PCB is disposed may be referred to as a front side of the PCB, and the other side (on which no ground plane of a PCB is disposed) may be referred to as a back side of the PCB.

With reference to the second aspect, in some embodiments, the slit may be disposed at a middle location of the second side edge, or may be disposed away from the middle location.

With reference to the second aspect, in some embodiments, the slot may be a U-shaped slot. For example, the slot may extend from a bottom edge of the metal frame to two side edges of the metal frame, and may be a U-shaped slot located at a bottom of the electronic device. Similarly, the slot may alternatively be a U-shaped slot located at a top of the electronic device, or a U-shaped slot on a side edge of the electronic device.

With reference to the second aspect, in some embodiments, the slot may be an L-shaped slot. For example, the slot may extend from a bottom edge of the metal frame to one side edge of the metal frame, and may be an L-shaped slot located on a left side or a right side of a bottom of the electronic device. Similarly, the slot may alternatively be an L-shaped slot located at a top of the electronic device.

With reference to the second aspect, in some embodiments, an arrangement location of the antenna apparatus in the electronic device may be one or more of the following: a bottom of the electronic device, a top of the electronic device, or a side edge of the electronic device.

With reference to the second aspect, in some embodiments, the electronic device may include a plurality of antenna apparatuses, and the plurality of antenna apparatuses may be arranged at a plurality of locations at the top, at the bottom, or on the side edge of the electronic device. For example, if the electronic device includes two antenna apparatuses, the two antenna apparatuses may be respectively arranged at the top and the bottom of the electronic device.

With reference to the second aspect, in some embodiments, the first feeding point and the second feeding point may be respectively connected to the positive electrode and the negative electrode of the feeding source by using a coaxial transmission line, the first feeding point is specifically connected to an inner conductor of the coaxial transmission line, and the second feeding point is specifically connected to an outer conductor of the coaxial transmission line.

With reference to the second aspect, in some embodiments, the first feeding point and the second feeding point may be disposed close to the slit, or may be respectively disposed close to the two ends of the slot.

With reference to the second aspect, in some embodiments, a size of the bridge structure is large, and some lumped components (for example, a lumped inductor) may be added to reduce the size. In other words, a part of the bridge structure is a lumped component.

With reference to the second aspect, in some embodiments, the bridge structure is not limited to the LDS metal support mounted on the back side of the PCB. Alternatively, the bridge structure may be formed by hollowing out the ground plane of the PCB.

BRIEF DESCRIPTION OF DRAWINGS

To describe technical solutions in embodiments of this application more clearly, the following describes accompanying drawings used in embodiments of this application.

FIG. 3C(1) and FIG. 3C(2) show a radiation pattern of the antenna design solution shown in FIG. 2A;

FIG. 10B(1) and FIG. 10B(2) show a radiation pattern of a slot antenna according to Embodiment 1;

FIG. 10C(1) and FIG. 10C(2) area diagram of an efficiency simulation of a slot antenna according to Embodiment 1:

FIG. 13B(1) and FIG. 13B(2) show a radiation pattern of a slot antenna according to Embodiment 2;

FIG. 13C(1) and FIG. 13C(2) are a diagram of an efficiency simulation of a slot antenna according to Embodiment 2;

DESCRIPTION OF EMBODIMENTS

The following describes embodiments of the present invention with reference to the accompanying drawings in embodiments of the present invention.

The technical solutions provided in this application are applicable to an electronic device that uses one or more of the following communications technologies: a Bluetooth (Bluetooth, BT) communications technology, a global positioning system (global positioning system, GPS) communications technology, a wireless fidelity (wireless fidelity, Wi-Fi) communications technology, a global system for mobile communications (global system for mobile communications, GSM) communications technology, a wideband code division multiple access (wideband code division multiple access, WCDMA) communications technology, a long term evolution (long term evolution. LTE) communications technology, a 5G communications technology, a SUB-6G communications technology, and other future communications technologies. In this application, the electronic device may be a mobile phone, a tablet computer, a personal digital assistant (personal digital assistant, PDA), or the like.

Figure 1:
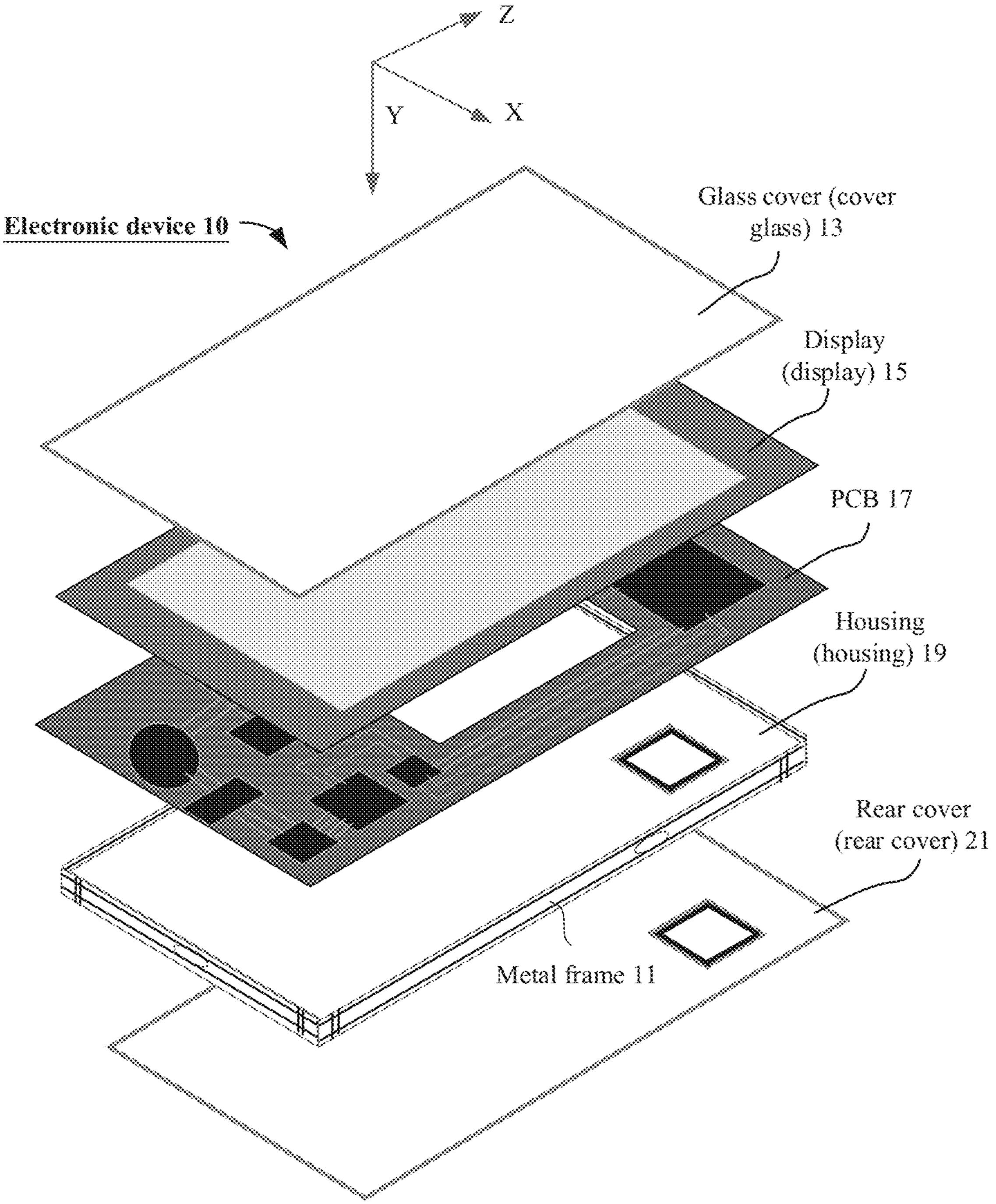
FIG. 1 is a schematic diagram of a structure of an electronic device on which an antenna design solution is based according to this application.

FIG. 1 shows an example of an internal environment of an electronic device on which an antenna design solution is based according to this application. As shown in FIG. 1, an electronic device 10 may include a glass cover 13, a display 15, a printed circuit board PCB 17, a housing 19, and a rear cover 21.

The glass cover 13 may be disposed closely in contact with the display 15, and may be mainly configured to protect the display 15 against dust.

The printed circuit board PCB 17 may be an FR-4 dielectric board, or may be a Rogers (Rogers) dielectric board, or may be a dielectric board mixing Rogers and FR-4, or the like. Herein, FR-4 is a grade designation for a flame-resistant material, and the Rogers dielectric board is a high-frequency board. A metal layer may be disposed on a side that is of the printed circuit board PCB 17 and that is close to the housing 19, and the metal layer may be formed by etching metal on a surface of the PCB 17. The metal layer may be used for grounding an electronic component carried on the printed circuit board PCB 17, to prevent a user from an electric shock or prevent a device from being damaged. The metal layer may be referred to as a ground plane of the PCB. In this application, in two sides of the PCB 17, a side on which the ground plane of the PCB is disposed may be referred to as a front side (front side) of the PCB, and the other side (on which no ground plane of a PCB is disposed) may be referred to as a back side (back side) of the PCB.

The housing 19 mainly supports the entire electronic device. The housing 19 may include a metal frame 11, and the metal frame 11 may be made of a conductive material such as metal. The metal frame 11 may extend around a periphery of the PCB 17 and the display 15, to help fasten the display 15. In an implementation, the metal frame 11 made of the metal material may be directly used as a metal frame of the electronic device 10, form an appearance of the metal frame, and is applicable to a metal ID. In another implementation, a non-metal frame, for example, a plastic frame, may alternatively be disposed on an outer surface of the metal frame 11, form an appearance of the non-metal frame, and is applicable to a non-metal ID.

The metal frame 11 may be divided into four parts, and the four parts may be named as a bottom edge, a top edge, and two side edges based on different locations of the four parts in the electronic device. The top edge may be disposed at a top of the electronic device 10, and the bottom edge may be disposed at a bottom of the electronic device 10. The two side edges may be respectively disposed on two sides of the electronic device 10. Components such as a front-facing camera (not shown), an earpiece (not shown), and an optical proximity sensor (not shown) may be disposed at the top of the electronic device 10. A USB charging interface (not shown), a microphone (not shown), and the like may be disposed at the bottom of the electronic device 10. A volume adjustment button (not shown) and a power button (not shown) may be disposed at the lateral sides of the electronic device 10.

The rear cover 21 may be a rear cover made of a non-metal material, for example, a non-metal rear cover such as a glass rear cover or a plastic rear cover, or may be a rear cover made of a metal material.

FIG. 1 shows only an example of some components included in the electronic device 10. An actual shape, an actual size, and an actual configuration of these components are not limited to those in FIG. 1.

To bring a more comfortable visual feeling to the user, a full-screen industrial design (industrial design. ID) may be used for the electronic device 10. The bezel-less screen means a large screen-to-body ratio (usually over 90%). A width of a frame of a full screen is greatly reduced, and internal components of the electronic device 10 such as a front-facing camera, a telephone receiver, a fingerprint sensor, and an antenna need to be re-arranged. Especially for an antenna design, a clearance area is reduced and antenna space is further compressed.

Figure 2A:
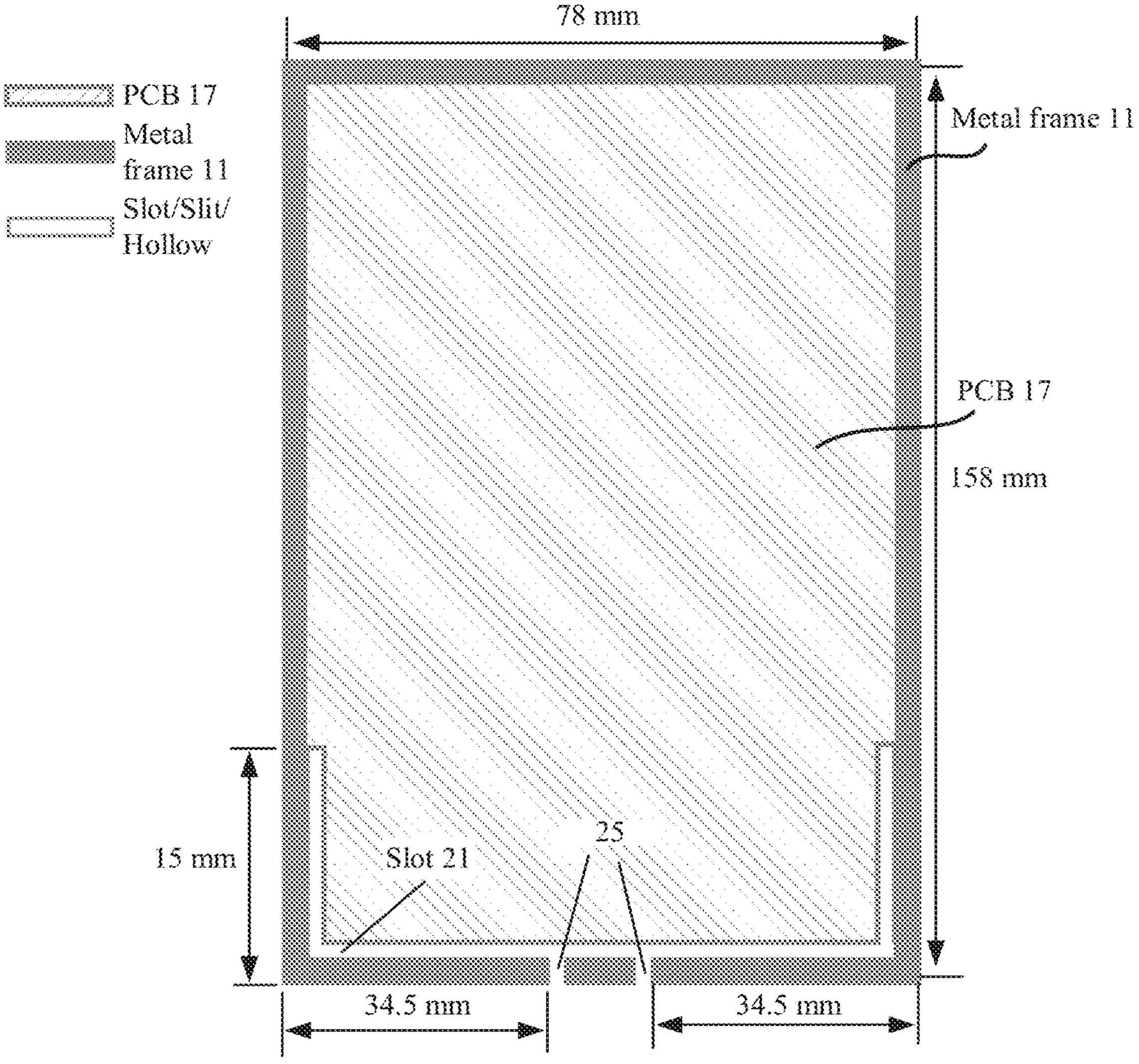
FIG. 2A is a schematic diagram of a MIMO antenna design solution in the conventional technology.
Figure 2B:
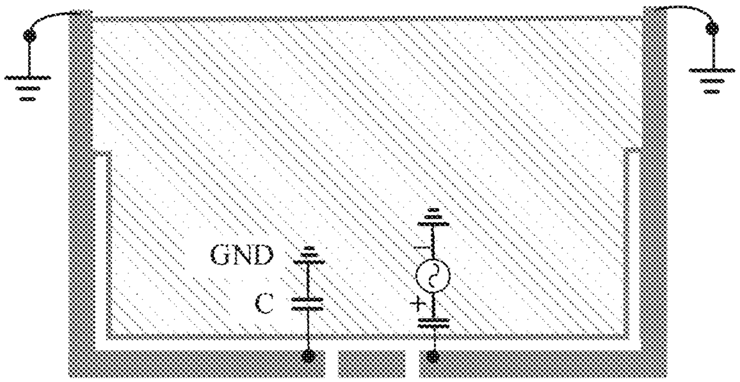
FIG. 2B is a schematic diagram of a structure of the antenna design solution shown in FIG. 2A.

In the conventional technology, when antenna design space is further reduced, an antenna design solution shown in FIG. 2A is usually used for a mobile phone with a common ID such as a metal frame or a glass rear cover, to implement a broadband antenna with a low SAR. FIG. 2B is a schematic diagram of a structure of a model shown in FIG. 2A.

As shown in FIG. 2A and FIG. 2B, a metal frame 11 and a ground plane of a PCB form a slot 21, and a slit 25 is disposed in the middle of a bottom edge of the metal frame 11. Feeding is performed on a metal frame 11 on one side of the slit 25, and a component (for example, a capacitor) is loaded on a metal frame 11 on the other side, to simultaneously excite a common mode slot antenna mode and a differential mode slot antenna mode, form dual resonances, and cover a wide frequency band. The common mode slot antenna mode and the differential mode slot antenna mode are described in the following content. Details are not described herein.

Figure 3A:
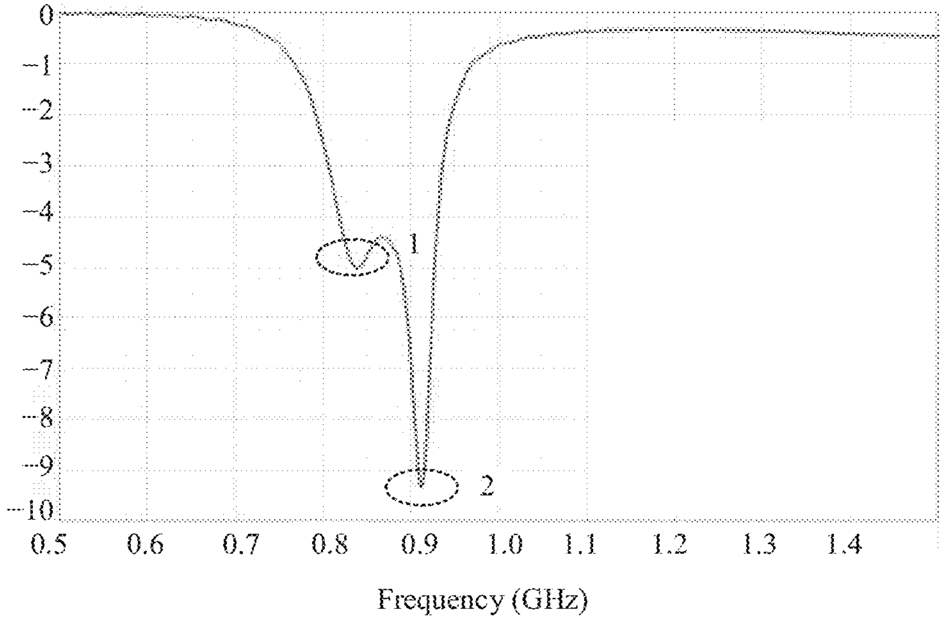
FIG. 3A is a diagram of an S11 simulation of the antenna design solution shown in FIG. 2A.
Figure 3B:
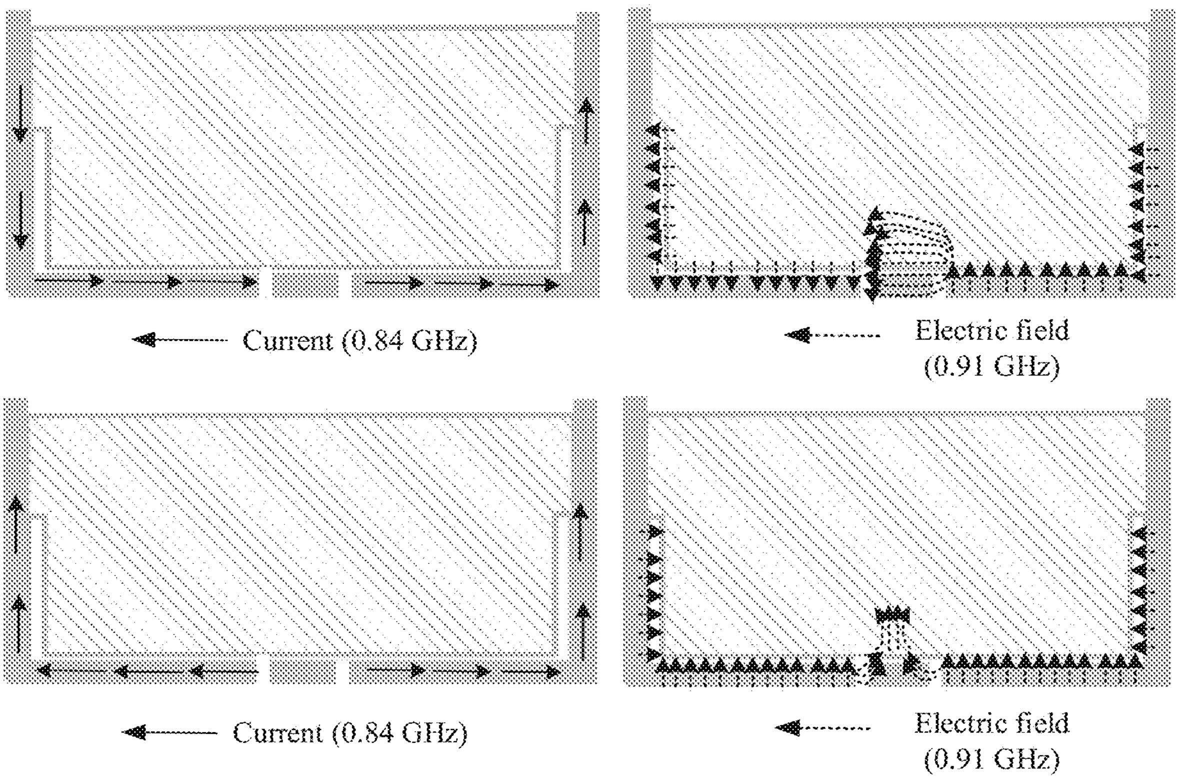
FIG. 3B is a schematic diagram of a current and an electric field of the antenna design solution shown in FIG. 2A.
Figure 3D:
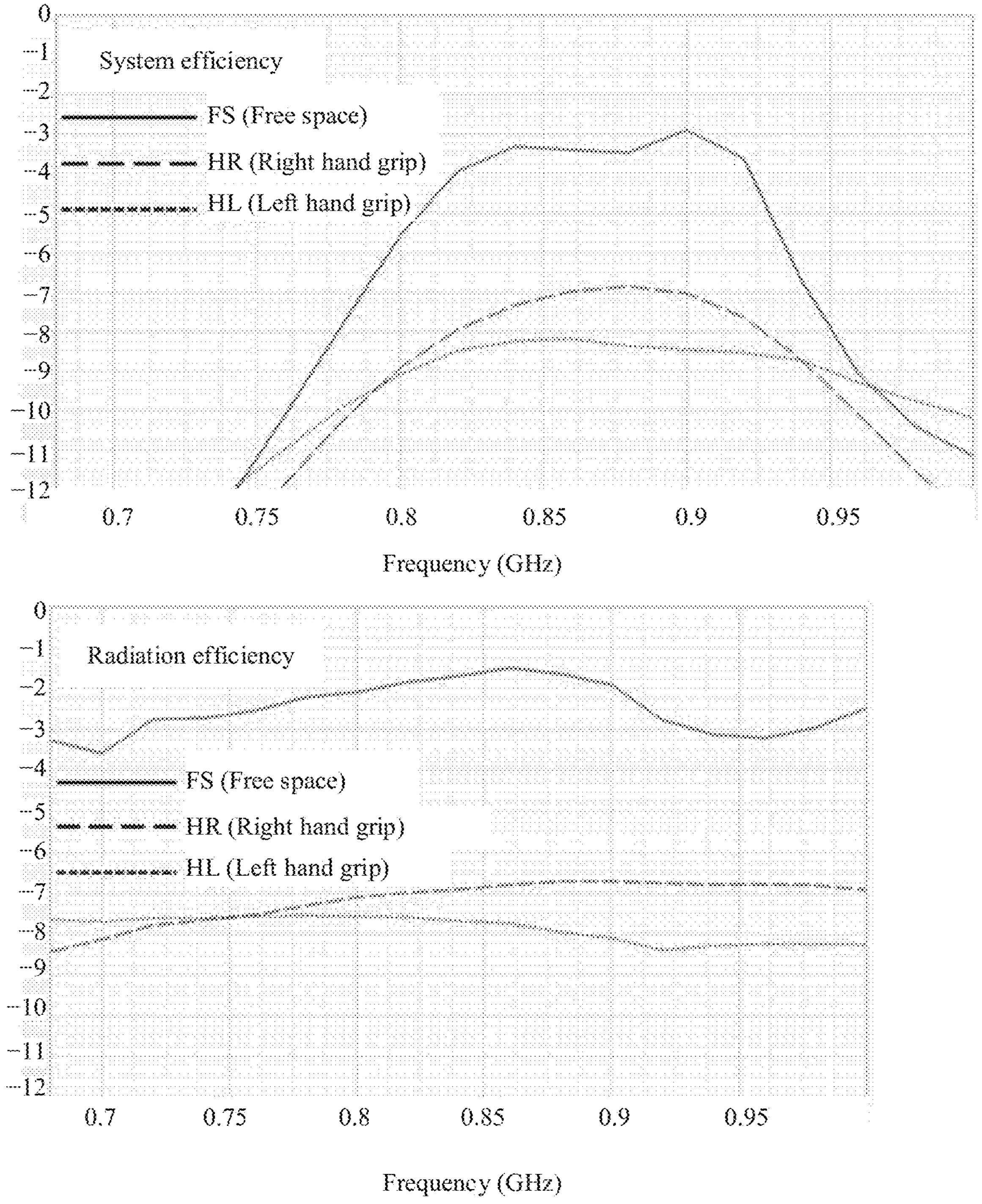
FIG. 3D is a diagram of an efficiency simulation of the antenna design solution shown in FIG. 2A.

FIG. 3A shows an S11 curve of an example antenna structure design in FIG. 2A on a low frequency band. A resonance "1" is at a frequency near 0.84 GHz, and a resonance "2" is at a frequency near 0.91 GHz. FIG. 3B shows distributions of a current and an electric field of an example antenna structure in FIG. 2A at a frequency near 0.84 GHz and a frequency near 0.91 GHz. The distributions respectively correspond to a common mode slot antenna mode (a low frequency resonance) and a differential mode slot antenna mode (a high frequency resonance). FIG. 3C(1) and FIG. 3C(2) show radiation patterns of an example antenna structure in FIG. 2A at two frequencies of 0.84 GHz and 0.91 GHz. FIG. 3D shows a comparison among efficiency curves of an example antenna structure in FIG. 2A in cases of a left hand grip, a right hand grip, and free space in a portrait-mode grip scenario. It can be learned that antenna performance in a case of the left hand grip differs greatly from antenna performance in a case of the right hand grip, and a difference in system efficiency and radiation efficiency is up to 1.5 dB, because radiation performance in the common mode slot antenna mode is different from radiation performance in the differential mode slot antenna mode.

This application provides an antenna design solution. An anti-symmetrical feeding structure is used to implement a wideband antenna design in which two resonant modes of a slot antenna are both a common mode slot antenna mode. The two resonances have a same radiation pattern, and performance in a case of a left hand grip and performance in a case of a right hand grip are equivalent. In addition, specific absorption ratio (specific absorption ratio, SAR) values of the two modes are close.

First, two antenna modes are described in this application.

Common Mode (Common Mode, CM) Slot Antenna Mode

Figure 4A:
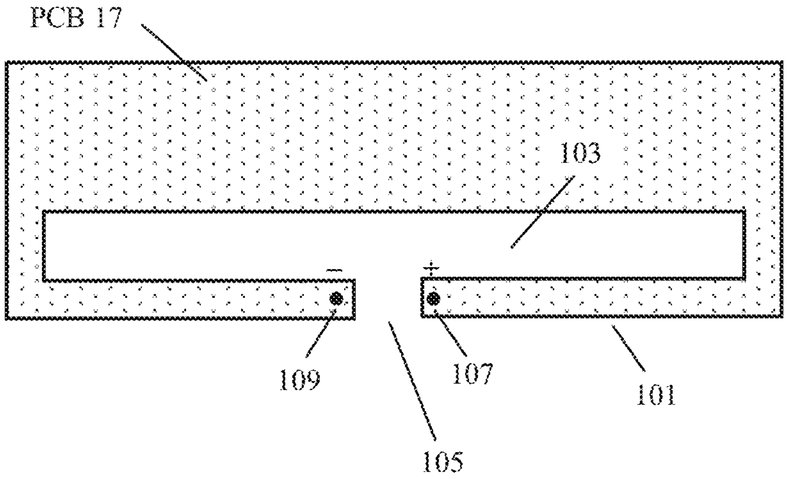
FIG. 4A is a schematic diagram of a CM slot antenna according to this application.

As shown in FIG. 4A, a slot antenna 101 may include a slot 103, a feeding point 107, and a feeding point 109. The slot 103 may be disposed on a ground plane of a PCB. An opening 105 is disposed on one side of the slot 103, and the opening 105 may be specifically disposed at a middle location of the side. The feeding point 107 and the feeding point 109 may be respectively disposed on two sides of the opening 105. The feeding point 107 and the feeding point 109 may be respectively configured to be connected to a positive electrode and a negative electrode of a feeding source of the slot antenna 101. For example, the slot antenna 101 is fed by using a coaxial transmission line, an inner conductor (transmission line center conductor) of the coaxial transmission line may be connected to the feeding point 107 through the transmission line, and an outer conductor (transmission line outer conductor) of the coaxial transmission line may be connected to the feeding point 109 through the transmission line. The outer conductor of the coaxial transmission line is grounded.

In other words, the slot antenna 101 may be fed at the opening 105, and the opening 105 may also be referred to as a feeding location. The positive electrode of the feeding source may be connected to one side of the opening 105, and the negative electrode of the feeding source may be connected to the other side of the opening 105.

Figure 4B:
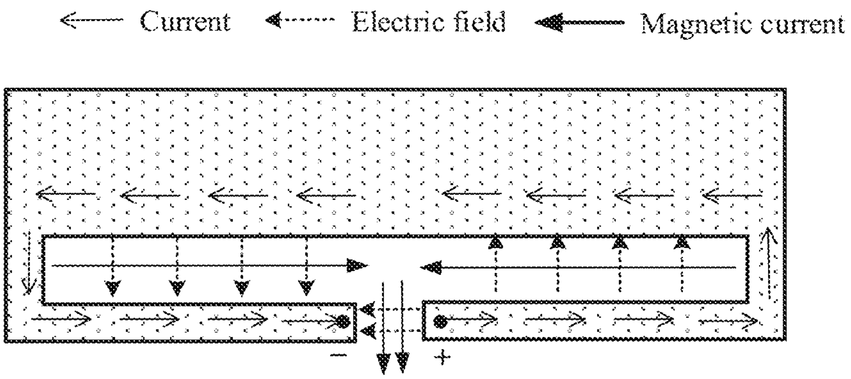
FIG. 4B is a schematic diagram of a distribution of a current, an electric field, and a magnetic current in a CM slot antenna mode.

FIG. 4B shows a distribution of a current, an electric field, and a magnetic current of a slot antenna 101. As shown in FIG. 4B, the current is distributed in a same direction on two sides of a middle location of the slot antenna 101, but the electric field and the magnetic current each are distributed in opposite directions on the two sides of the middle location of the slot antenna 101. Such a feeding structure shown in FIG. 4A may be referred to as an anti-symmetrical feeding structure. Such a slot antenna mode shown in FIG. 4B may be referred to as a CM slot antenna mode. The electric field, the current, and the magnetic current shown in FIG. 4B may be respectively referred to as an electric field, a current, and a magnetic current m the CM slot antenna mode.

The current and the electric field in the CM slot antenna mode are generated when parts of the slot that are on the two sides of the middle location of the slot antenna 101 separately operate in a ¼ wavelength mode: The current is weak at the middle location of the slot antenna 101, and is strong at two ends of the slot antenna 101. The electric field is strong at the middle location of the slot antenna 101, and is weak at the two ends of the slot antenna 101.

Differential Mode (Differential Mode, DM) Slot Antenna Mode

Figure 5A:
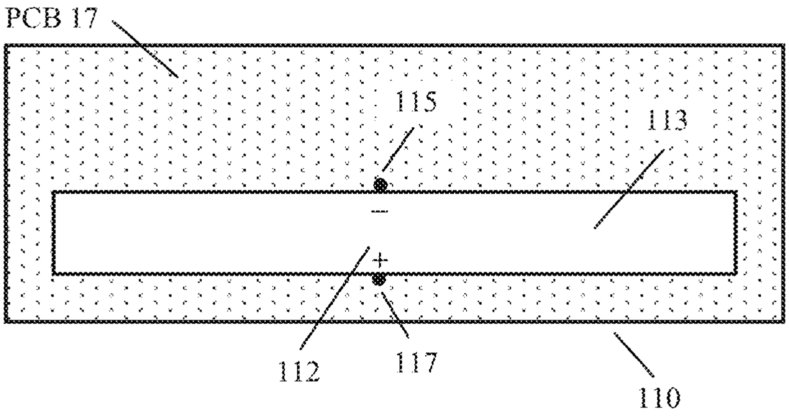
FIG. 5A is a schematic diagram of a DM slot antenna according to this application.

As shown in FIG. 5A, a slot antenna 110 may include a slot 113, a feeding point 117, and a feeding point 115. The slot 113 may be disposed on a ground plane of a PCB. The feeding point 117 and the feeding point 115 may be respectively disposed at middle locations of two side edges of the slot 113. The feeding point 117 and the feeding point 115 may be respectively configured to be connected to a positive electrode and a negative electrode of a feeding source of the slot antenna 110. For example, the slot antenna 110 is fed by using a coaxial transmission line, an inner conductor of the coaxial transmission line may be connected to the feeding point 117 through the transmission line, and an outer conductor of the coaxial transmission line may be connected to the feeding point 115 through the transmission line. The outer conductor of the coaxial transmission line is grounded.

In other words, a middle location 112 of the slot antenna 110 is connected to the feeding source, and the middle location 112 may also be referred to as a feeding location. The positive electrode of the feeding source may be connected to one side edge of the slot 113, and the negative electrode of the feeding source may be connected to the other side edge of the slot 113.

Figure 5B:
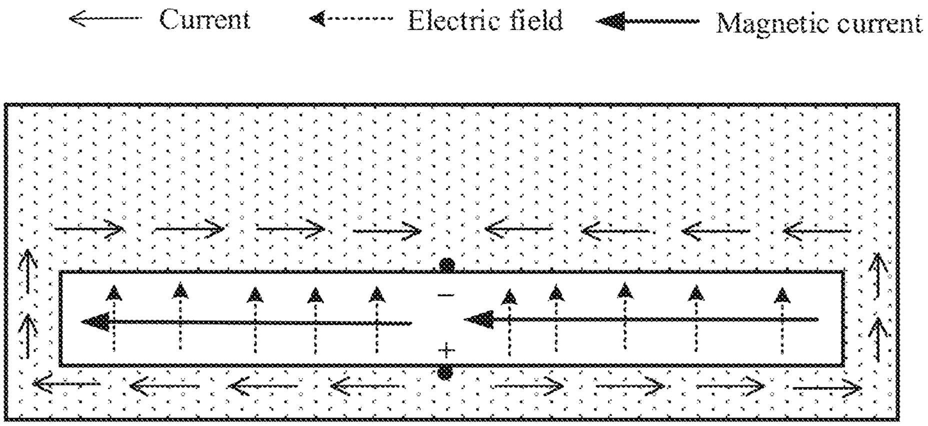
FIG. 5B is a schematic diagram of a distribution of a current, an electric field, and a magnetic current in a DM slot antenna mode.

FIG. 5B shows a distribution of a current, an electric field, and a magnetic current of the slot antenna 110. As shown in FIG. 5B, the current is distributed in opposite directions on two sides of the middle location 112 of the slot antenna 110, but the electric field and the magnetic current each are distributed in a same direction on the two sides of the middle location 112 of the slot antenna 110. Such a feeding structure shown in FIG. 5A may be referred to as a symmetrical feeding structure. Such a slot antenna mode shown in FIG. 5B may be referred to as a DM slot antenna mode. The electric field, the current, and the magnetic current shown in FIG. 5B may be respectively referred to as an electric field, a current, and a magnetic current in the DM slot antenna mode.

The current and the electric field in the DM slot antenna mode are generated when the entire slot 21110 operates in a ½ wavelength mode: The current is weak at the middle location of the slot antenna 110, and is strong at two ends of the slot antenna 110. The electric field is strong at the middle location of the slot antenna 110, and is weak at the two ends of the slot antenna 110.

The following describes in detail a plurality of embodiments provided in this application with reference to the accompanying drawings. In the following embodiments, an antenna simulation is performed based on the following environment: a width of an entire electronic device is 78 mm, and a length of the entire electronic device is 158 mm. A thickness of a metal frame 11 is 4 mm, a width is 3 mm, and an antenna clearance of a Z-directed projection region is 1 mm. A width of a slit (for example, a slit 25) on the metal frame 11 ranges from 1 mm to 2 mm. A dielectric constant of a material filled in a slot (for example, a slot 21) formed between the metal frame 11 and a ground plane of a PCB, the slit 25 on the metal frame 11, and a gap between a bridge structure 29 and the ground plane of the PCB is 3.0, and a loss angle is 0.01.

Embodiment 1

In this embodiment, a metal frame 11 and a ground plane of a PCB form a slot antenna radiator, and two low frequency (an operating frequency band is near LTE B5) CM slot antenna modes of the slot antenna radiator are separately excited through anti-symmetrical feeding.

Figure 6A:
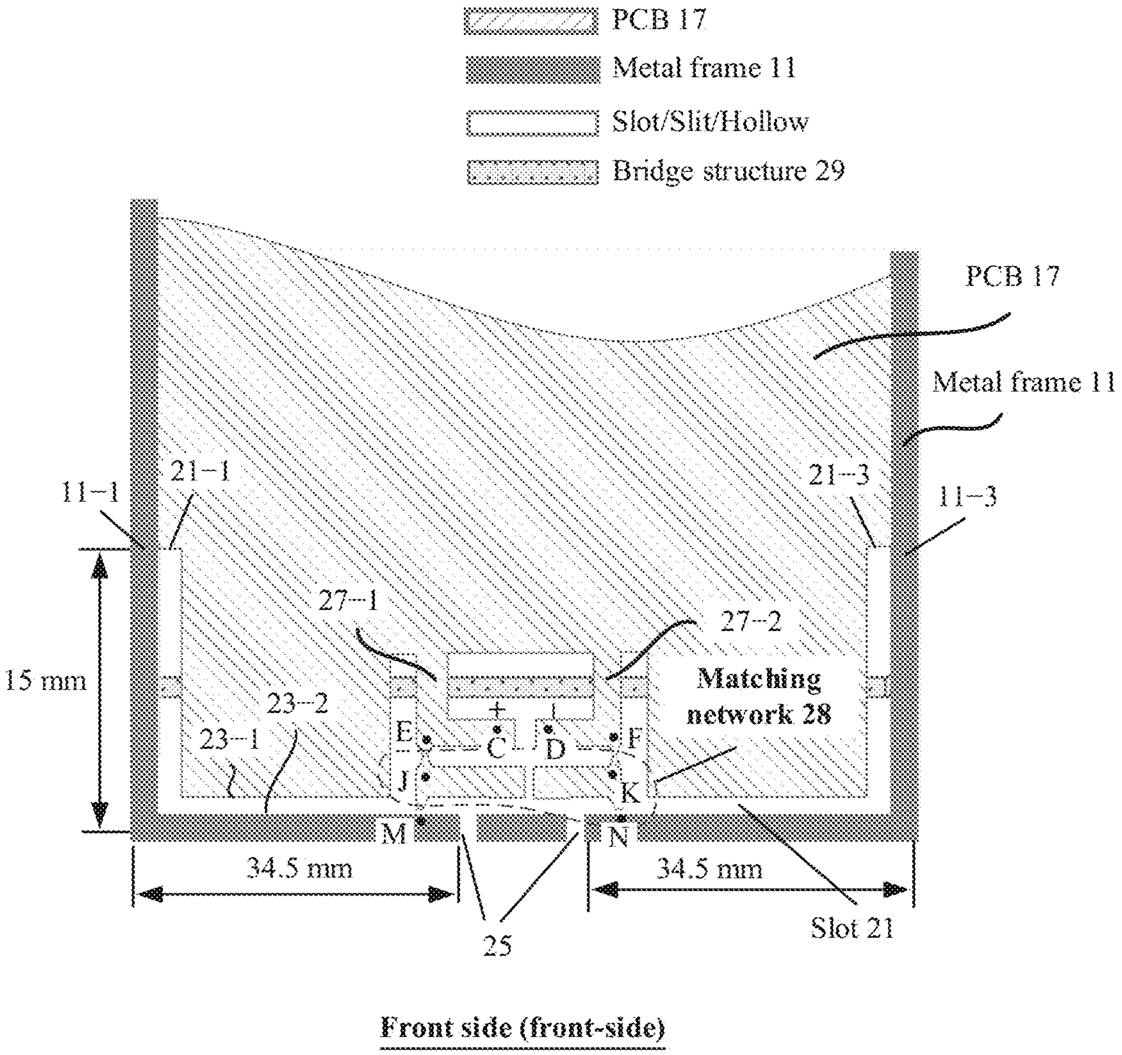
FIG. 6A is a front-side view of a slot antenna according to Embodiment 1.
Figure 6B:
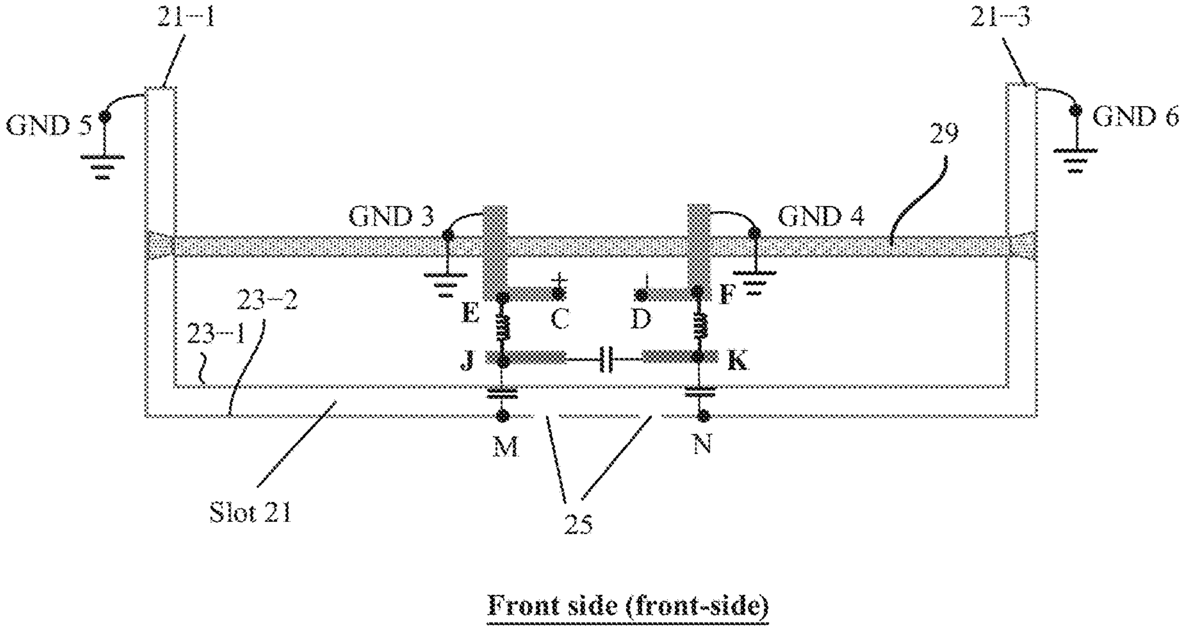
FIG. 6B is a simple diagram of a front-side structure of a slot antenna according to Embodiment 1.
Figure 6C:
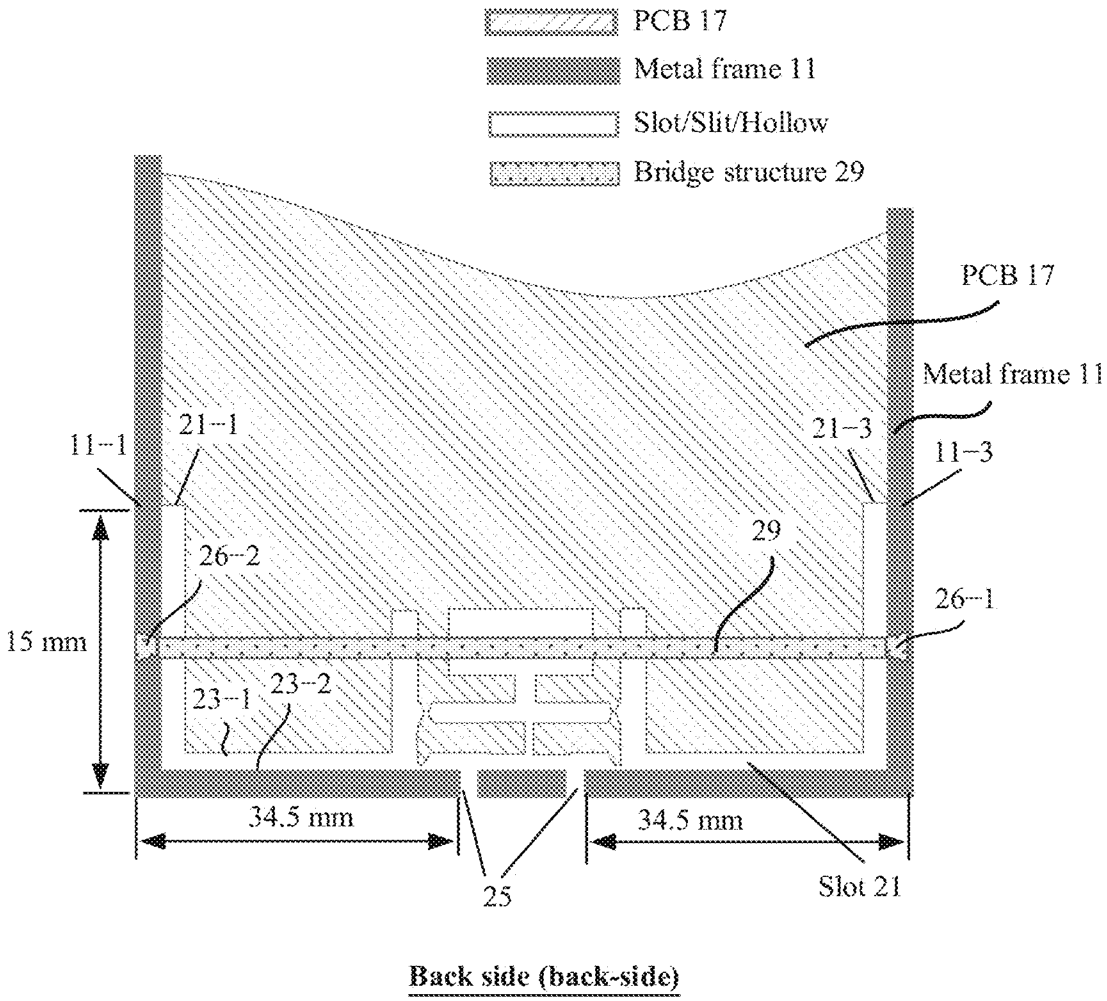
FIG. 6C is a back-side view of a slot antenna according to Embodiment 1.
Figure 6D:
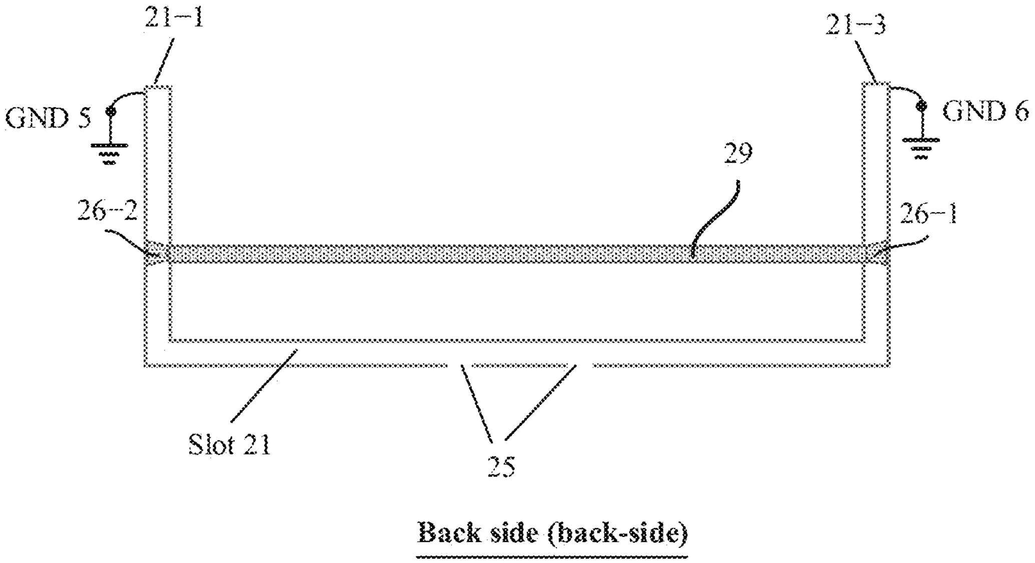
FIG. 6D is a simple diagram of a back-side structure of a slot antenna according to Embodiment 1.

FIG. 6A to FIG. 6D show a slot antenna provided in Embodiment 1. FIG. 6A is a front-side view (front-side view) of the slot antenna. FIG. 6B is a simple diagram of a front-side structure of the slot antenna. FIG. 6C is a back-side view (back-side view) of the slot antenna. FIG. 6D is a simple diagram of a back-side structure of the slot antenna. Herein, a front side is a front side of a PCB 17, and a back side is a back side of the PCB 17. The front-side view shows an anti-symmetrical feeding design of an antenna structure, and a back-side view shows a symmetrical feeding design of the antenna structure.

As shown in FIG. 6A to FIG. 6D, the slot antenna provided in Embodiment 1 may include a slot 21, a feeding point M. and a feeding point N.

The slot 21 may be disposed between the PCB 17 and a first section of the metal frame 11. One side edge 23-1 of the slot 21 includes one side edge 17-1 of the PCB 17, and the other side edge 23-2 includes the first section of the metal frame 11. The first section of the metal frame 11 may be a segment of the metal frame from a location 11-1 to a location 11-3. The side edge 23-1 may be referred to as a first side edge, and the side edge 23-2 may be referred to as a second side edge. The first section of the metal frame 11 may be specifically a bottom edge of the metal frame. In other words, the slot 21 may be disposed between the PCB 17 and the bottom edge of the metal frame. For example, as shown in FIG. 6A, the slot 21 may extend from the bottom edge of the metal frame 11 to a side edge of the metal frame 11, and may be a U-shaped slot that has a symmetrical structure and that is located at a bottom of an electronic device 10.

Two ends of the slot 21 may be grounded, and the two ends may include one end 21-1 and the other end 21-3.

A slit 25 may be disposed the side edge 23-2 that is of the slot 21 and that includes the metal frame 11. The slit 25 may connect the slot 21 and external free space. There may be one or more slits 25 on the side edge 23-2.

When there is one slit 25 on the side edge 23-2, the side edge 23-2 may include two parts: a first part and a second part. The first part is located on one side of the slit 25, and the second part is located on the other side of the slit 25.

When there are a plurality of slits 25 on the side edge 23-2, the plurality of slits 25 may divide the side edge 23-2, to form a floating section. Specifically, when there are a plurality of slits 25 on the side edge 23-2, the side edge 23-2 may include three parts: a first part, a second part, and a third part. The first part is located on one side of the third part, the second part is located on the other side of the third part, and the third part may include the plurality of slits 25 and a floating section between the plurality of slits 25. For example, when there are two slits 25 (which may be respectively referred to as a first slit and a second slit) on the side edge 23-2, the side edge 23-2 may include three parts: a first part, a second part and a third part, the first part is located on one side of the third part, the second part is located on the other side of the third part, and the third part may include the two slits 25 and a floating section between the two slits 25.

The slit 25 may be disposed at a middle location of the side edge, or may be disposed away from the middle location. If there are a plurality of slits 25, the slits 25 are disposed at the middle location of the side edge. That the slits 25 are disposed at the middle location of the side edge may mean that the plurality of slits are located at the middle location of the side edge 23-2 as a whole.

The feeding point M and the feeding point N may be located on the side edge 23-2 that is of the slot 21 and that includes the metal frame 11, and specifically, may be respectively disposed on two sides of the slit 25. In other words, the feeding point M is located on the first part of the side edge 23-2, and the feeding point N is located on the second part of the side edge 23-2.

The slot antenna provided in Embodiment 1 may be of an anti-symmetrical feeding structure. In other words, the feeding point M and the feeding point N may be respectively used to be connected to a positive electrode and a negative electrode of a feeding source. For example, the slot antenna may be fed by using a coaxial transmission line, an inner conductor (which is connected to the positive electrode of the feeding source) of the coaxial transmission line may be connected to the feeding point M through the transmission line, and an outer conductor (which is grounded) of the coaxial transmission line may be connected to the feeding point N through the transmission line. On the side edge 23-2 of the slot 21, the feeding point M and the feeding point N may be specifically symmetrically disposed on two sides of the middle location of the side edge 23-2.

Figure 7:
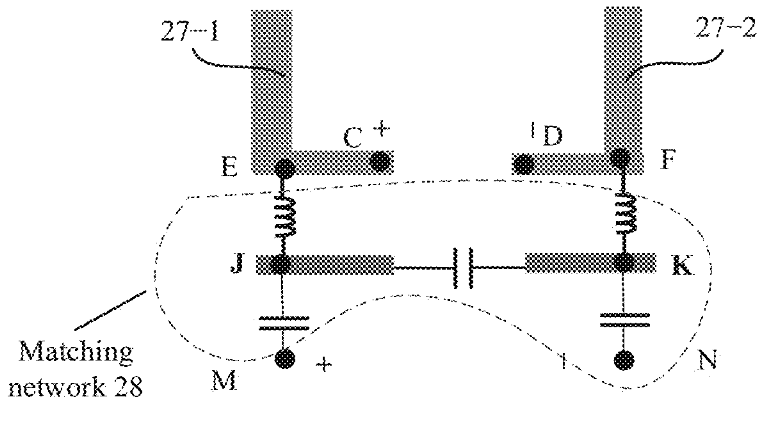
FIG. 7 is a schematic diagram of an anti-symmetrical feeding structure.

As shown in FIG. 6A and FIG. 6B, a feeding network connected to the feeding point M and the feeding point N may be specifically implemented by hollowing out the PCB 17, so that the feeding network is implemented by fully using a ground plane of the PCB on the front side of the PCB 17, to reduce design space. For example, as shown in FIG. 6A, a local area at a center of a bottom of the PCB 17 may be hollowed out to form the feeding network of the slot antenna: Two bilaterally symmetrical parallel conducting wires 27-1 and 27-2 extend from the ground plane of the PCB, and a positive electrode C and a negative electrode D of the feeding source are formed between the conducting wire 27-1 and the conducting wire 27-2. Connection points between the feeding network and the slot antenna are the feeding point M and the feeding point N. When a matching network is configured, the connection point is a connection point at which the feeding network is indirectly connected to the slot antenna through the matching network. An equivalent circuit of the feeding network may be shown in FIG. 7.

In addition, a matching network 28 of the feeding network can be further formed by hollowing out the PCB 17. Connection points between the matching network 28 and the feeding network are a connection point E, a connection point F, a connection point J, and a connection point K. FIG. 6A and FIG. 6B merely show an example implementation of a matching network. There may alternatively be a different matching network. This is not limited in this application.

Such a feeding structure shown in FIG. 6A and FIG. 6B may be used to excite the slot antenna to generate a CM slot antenna mode. The anti-symmetrical feeding structure is not limited to a form in which parallel double conducting wires (the conducting wire 27-1 and the conducting wire 27-2) are used. Another feeding form of a balun structure may also be used. This is not limited in this application.

Figure 8:
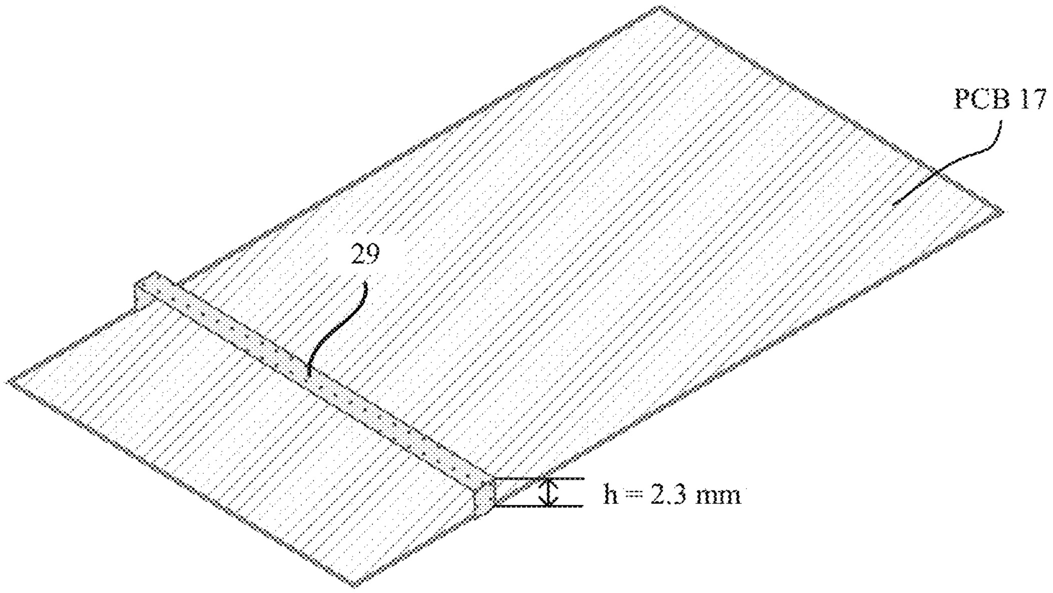
FIG. 8 is a schematic diagram in which a "bridge" structure is mounted on a PCB.

Further, the slot antenna provided in Embodiment 1 may further include a bridge structure 29. The bridge structure 29 may be a metal support of a laser direct structure (laser direct structuring, LDS), and may be mounted on the back side of the PCB 17. For example, as shown in FIG. 8, a height of mounting the bridge structure 29 on the back side of the PCB 17 may be 2.3 mm. This is not limited. The height may alternatively have another value. This is not limited in this application. The bridge structure 29 may be referred to as a “bridge” structure of the slot on the two sides of the slit 25, to optimize impedance matching. Two ends of the bridge structure 29 may be connected to the slot 21, and specifically, may be respectively connected to parts of the slot that are on the two sides of the slit.

The two ends of the bridge structure 29 include a first end 26-2 and a second end 26-1. The first end 26-2 may be connected to the first part of the side edge 23-2, or extend to the slot over the first side edge, and the second end 26-1 may be connected to the second part of the side edge 23-2, or extend to the slot over the first side edge. When the slot 21 is a U-shaped slot extending to the side edge of the metal frame 11, the first end 26-2 and the second end 26-1 may be specifically connected to two side edges of the metal frame 11.

Figure 9A:
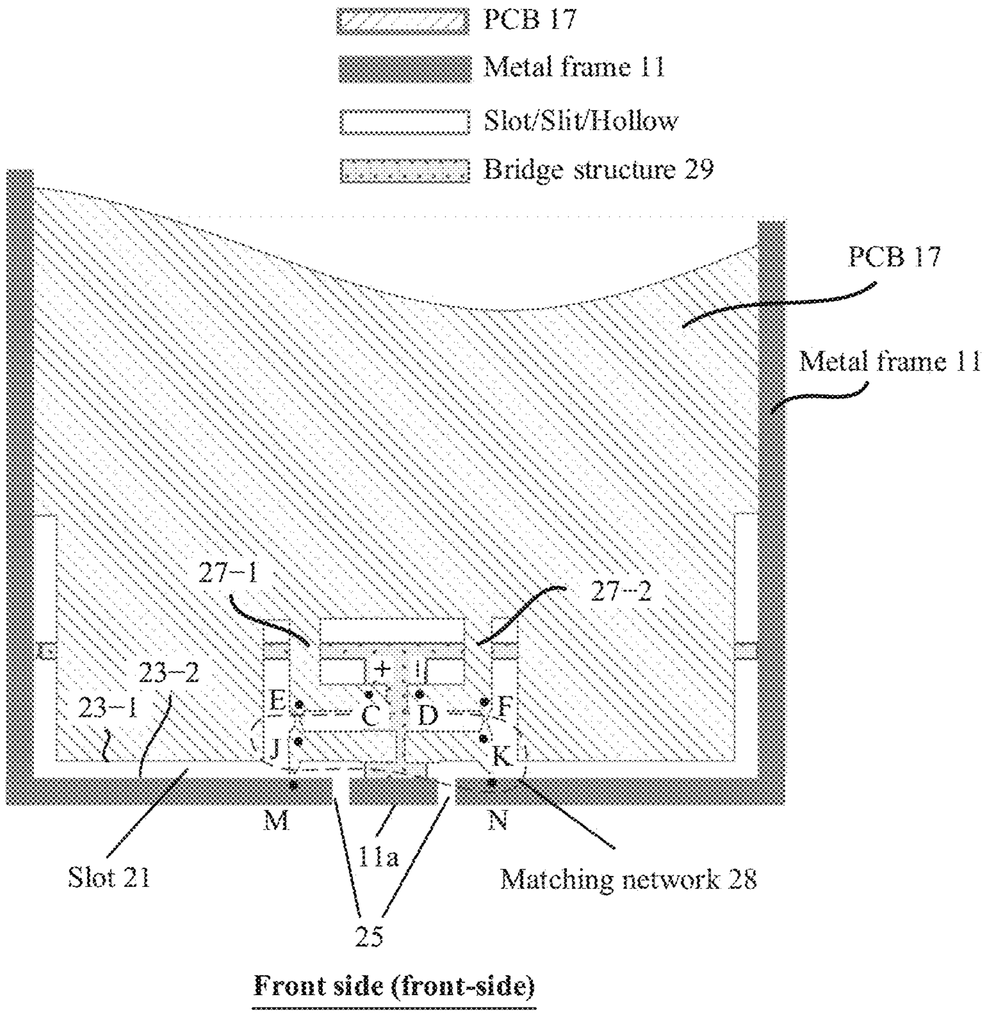
FIG. 9A is a front-side view of a slot antenna according to an extended solution in Embodiment 1.
Figure 9B:
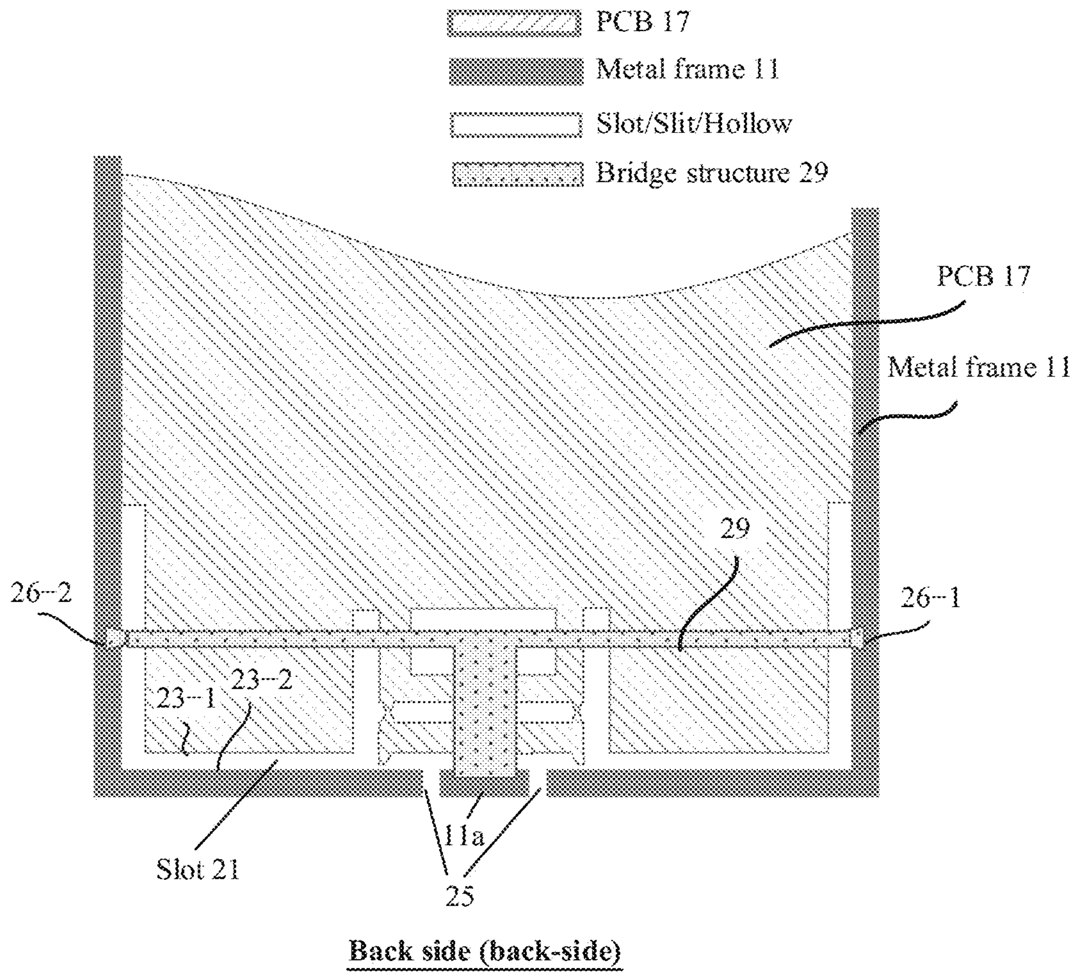
FIG. 9B is a back-side view of a slot antenna according to an extended solution in Embodiment 1.

The bridge structure 29 is not limited to that shown in FIG. 6A, and may alternatively be deformed. For example, as shown in FIG. 9A and FIG. 9B, in addition to parts of the slot antenna radiator that are on the two sides of the middle location of the slot antenna, the bridge structure 29 is further connected to a floating metal frame 11*a* in the middle of the slit 25 of the floating metal frame 11. Specifically, a T-shaped structure may include a transverse branch and a vertical branch. Two ends of the transverse branch (for example, a fifth end 26-2 and a sixth end 26-1) may be respectively connected to parts of the slot that are on the two sides of the slit 25. Specifically, the fifth end 26-2 is connected to the first part of the side edge 23-2, and the sixth end 26-1 is connected to the second part of the side edge 23-2. The vertical branch may be connected to the floating metal frame 11*a*. In addition to the floating metal frame 11*a* between two slits 25, there may be more slits 25, and more floating metal frames are obtained through division. In this case, a matching component in the anti-symmetrical feeding structure in the CM slot antenna mode may be adjusted.

A dimension of the slot antenna provided in Embodiment 1 may be as follows: A width of the slot 21 is 1 mm. A closed end (a negative electrode) of the slot 21 extends to two ends of the side edge of the metal frame 11, and a distance to the bottom edge of the metal frame 11 is 15 mm. Widths of two slits disposed at a bottom of the metal frame 11 are 1 mm, and a distance between the two slits is 8 mm. A distance between a left slit and a left side of the metal frame 11 is 34.5 mm, and a distance between a right slit and a right side of the metal frame 11 is 34.5 mm.

The following describes a simulation of the slot antenna provided in Embodiment 1 with reference to the accompanying drawings.

Figure 10A:
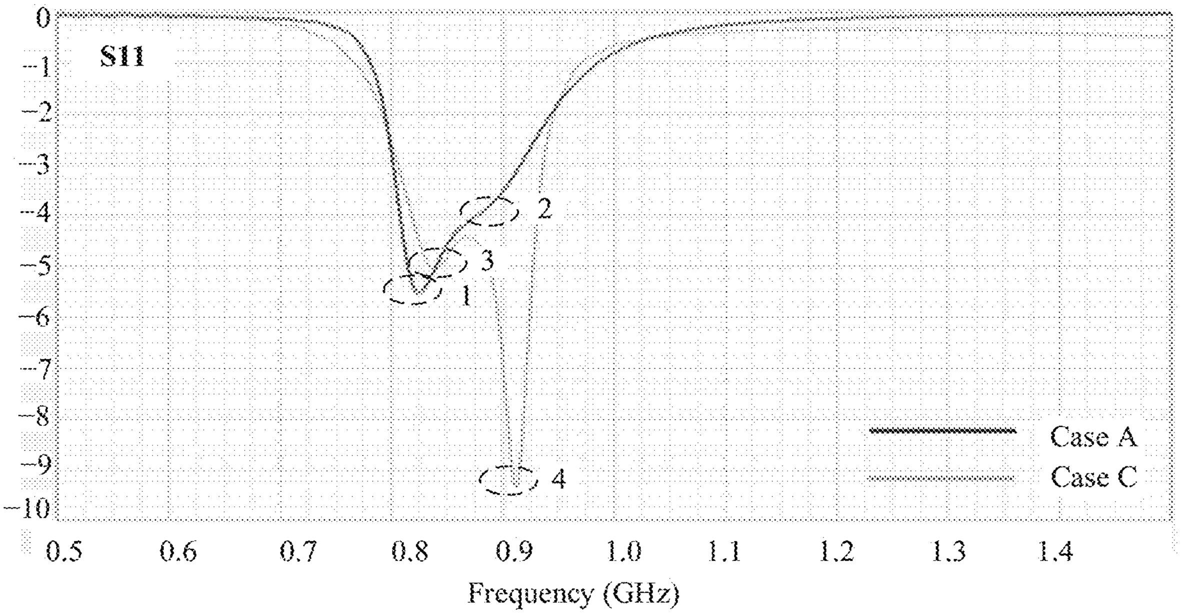
FIG. 10A is a diagram of an S11 simulation of a slot antenna according to Embodiment 1.

FIG. 10A to FIG. 10C(1) and FIG. 10C(2) respectively show a reflection coefficient, a radiation directivity coefficient, and antenna efficiency of the slot antenna provided in Embodiment 1.

FIG. 10A shows a curve of a group of reflection coefficients in a simulation of the slot antenna provided in Embodiment 1. A resonance “1” (0.82 GHz) and a resonance “2” (0.87 GHz) represent two resonances generated by the slot antenna provided in Embodiment 1. Both the resonance “1” and the resonance “2” are generated in the CM slot antenna mode of the slot antenna provided in Embodiment 1. FIG. 10A further shows a comparison between two resonances, namely, a resonance “3” and a resonance “4” generated by the slot antenna shown in FIG. 2A. In addition to frequency bands of 0.82 GHz and 0.87 GHz shown in FIG. 10A, the slot antenna provided in Embodiment 1 may further generate a resonance on other low frequency band, it may be specifically implemented by adjusting a size of the slot antenna.

FIG. 10B(1) and FIG. 10B(2) show radiation patterns of the two resonances of the slot antenna provided in Embodiment 1. A radiation pattern of the resonance “1” (0.82 GHz) is basically the same as a radiation pattern of the resonance “2” (0.87 GHz). In addition, the slot antenna provided in Embodiment 1 has a very low directivity coefficient and a wider pattern coverage on a low frequency band.

FIG. 1C(1) and FIG. 10C(2) show a comparison among efficiency curves of the slot antenna provided in Embodiment 1 in cases of a left hand grip, a right hand grip, and free space in a portrait-mode grip scenario. FIG. 10C(1) and FIG. 10C(2) further show a comparison among efficiency curves of the slot antenna shown in FIG. 2A in cases of a left hand grip, a right hand grip, and free space in a portrait-mode grip scenario. It can be learned that, compared with the slot antenna shown in FIG. 2A, the slot antenna provided in Embodiment 1 has basically same efficiency in cases of the left hand grip and the right hand grip in the portrait-mode grip scenario, and an efficiency value of the efficiency in the cases of the left hand grip and the right hand grip in the portrait-mode grip scenario is approximately between efficiency in a case of the left hand grip and efficiency in a case of the right hand grip of the slot antenna shown in FIG. 2A.

It can be learned from all simulation results shown in FIG. 10A to FIG. 10C(1) and FIG. 10C(2) that, at a low frequency, compared with the slot antenna shown in FIG. 2A, the slot antenna provided in Embodiment 1 has equivalent performance in the cases of the left hand grip and the right hand grip in the portrait-mode grip scenario.

Figure 11:
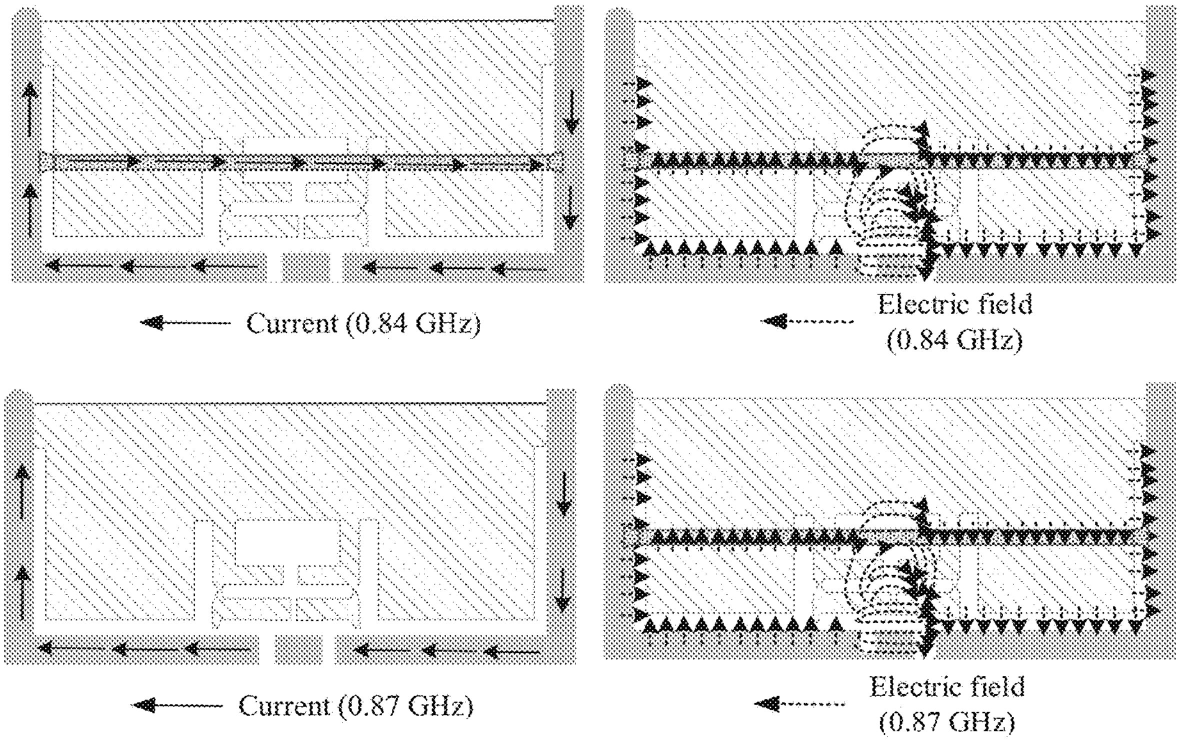
FIG. 11 is a schematic diagram of distributions of a current and an electric field of two resonances of a slot antenna according to Embodiment 1.

FIG. 11 shows distributions of currents and electric fields of two resonances, namely, a current and an electric field of the resonance “1” (0.82 GHz) and a current and an electric field of the resonance “2” (0.87 GHz), of the slot antenna provided in Embodiment 1. It can be learned from FIG. 11 that the current of the resonance “1” (0.82 GHz) is distributed on the metal frame 11 around the bridge structure 29 and the slot 21, and the current of the resonance “2” (0.87 GHz) is distributed on the metal frame 11 around the slot 21. The current of the resonance “1” (0.82 GHz) and the current of the resonance “2” (0.87 GHz) each are distributed in a same direction on the two sides of the middle location of the slot antenna, but each electric field is distributed in opposite directions on the two sides of the middle location of the slot antenna. The currents of the two resonances are both currents in the CM slot antenna mode, and the electric fields of the two resonances are both electric fields in the CM slot antenna mode. The current and the electric field in the CM slot antenna mode are generated when parts of the slot antenna radiator that are on the two sides of the middle location of the slot antenna separately operate in a ¼ wavelength mode: The current is weak at the middle location of the slot antenna, and is strong at two ends of the slot antenna. The electric field is strong at the middle location of the slot antenna, and is weak at the two ends of the slot antenna.

In addition, Table 1 shows an SAR of the electronic device 10 for which the slot antenna provided in Embodiment 1 is used. Table 2 shows an SAR of the electronic device 10 for which the slot antenna shown in FIG. 2A is used. Table 1 and Table 2 show a comparison of performance of the two antenna designs in a case of a low SAR. The comparison is performed when the slot antenna provided in Embodiment 1 and the slot antenna shown in FIG. 2A are both arranged at a bottom of the electronic device 10.

TABLE 1

| SAR | 0.83 GHz | 0.86 GHz |
|---|---|---|
| Back (distance: 5 mm) | 1.13 | 1.22 |
| Bottom (distance: 5 mm) | 0.60 | 0.59 |
| Efficiency normalization (−5 dB) | | |
| Back (distance: 5 mm) | 0.71 | 0.83 |
| Bottom (distance: 5 mm) | 0.38 | 0.40 |

TABLE 2

| SAR | 0.83 GHz | 0.86 GHz |
|---|---|---|
| Back (distance: 5 mm) | 1.40 | 1.57 |
| Bottom (distance: 5 mm) | 0.65 | 0.70 |
| Efficiency normalization (−5 dB) | | |
| Back (distance: 5 mm) | 0.95 | 1.05 |
| Bottom (distance: 5 mm) | 0.44 | 0.47 |

Table 1 and Table 2 show an SAR in a standard of 10 g. It can be learned that when an output power is 24 dB, an entire SAR (an SAR of the back and an SAR of the bottom) of the electronic device 10 for which the slot antenna provided in Embodiment 1 is used is low. When efficiency is normalized to −5 dB, the slot antenna provided in Embodiment 1 has a more obvious advantage in a case of a low SAR. The SAR of the back is measured when a human tissue is 5 mm away from the back of the electronic device, and the SAR of the bottom is measured when the human tissue is 5 mm away from the bottom of the electronic device.

It can be learned that, in the antenna design solution provided in Embodiment 1, the metal frame 11 and the ground plane of the PCB form a slot antenna radiator, and two low frequency (an operating frequency band is near LTE B5) CM slot antenna modes of the slot antenna radiator are separately excited through symmetrical feeding. When dual resonances and wideband coverage are implemented, performance in a case of the left hand grip and performance in a case of the right hand grip are equivalent, and SAR values in the two modes are close.

Embodiment 2

For a slot antenna provided in this embodiment, two medium/high frequency (an operating frequency band is near 2.4 GHz Wi-Fi) CM slot antenna modes of the slot antenna may be separately excited through anti-symmetrical feeding.

Figure 12A:
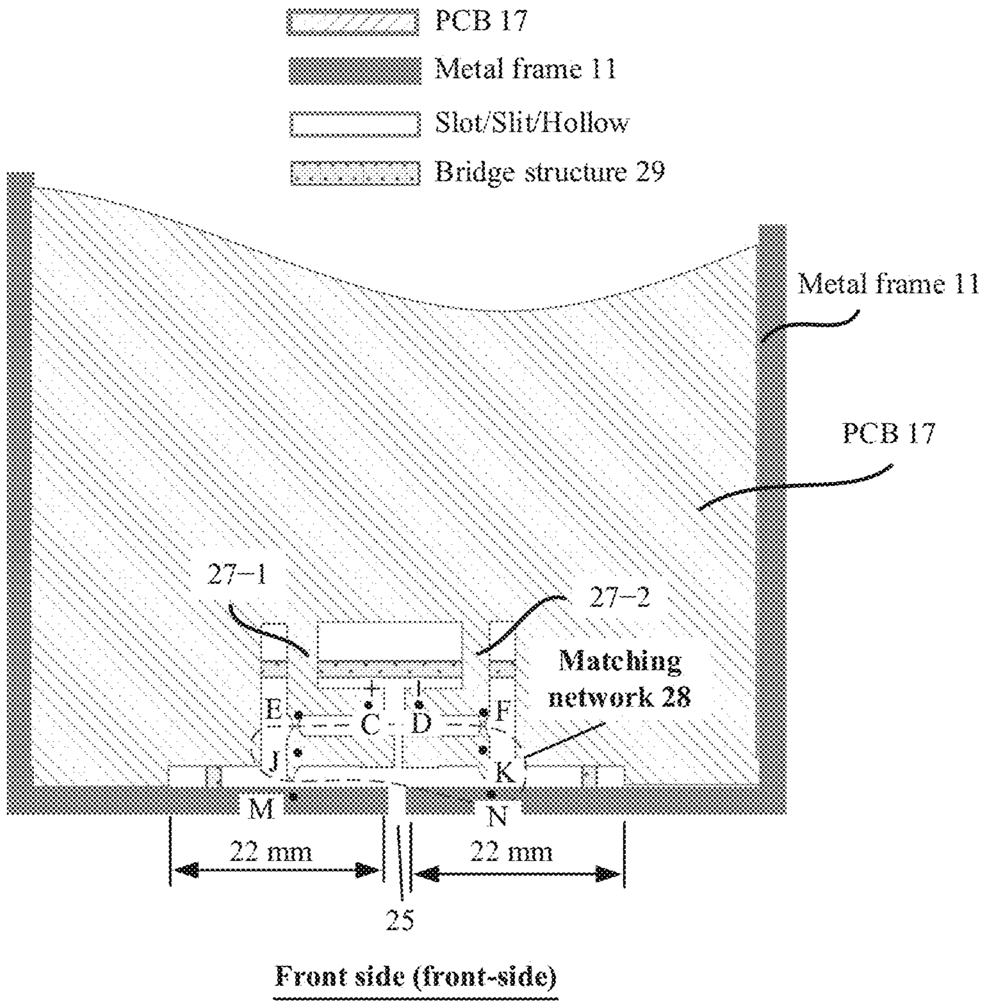
FIG. 12A is a front-side view of a slot antenna according to Embodiment 2.
Figure 12B:
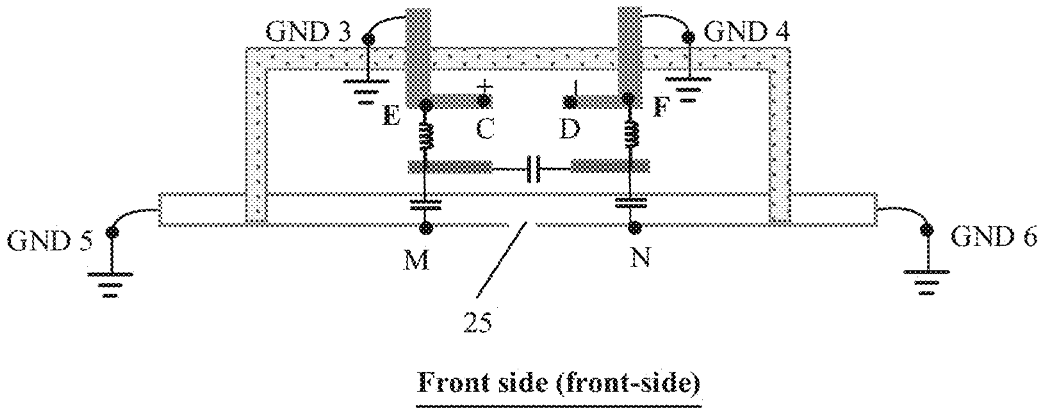
FIG. 12B is a simple diagram of a front-side structure of a slot antenna according to Embodiment 2.
Figure 12C:
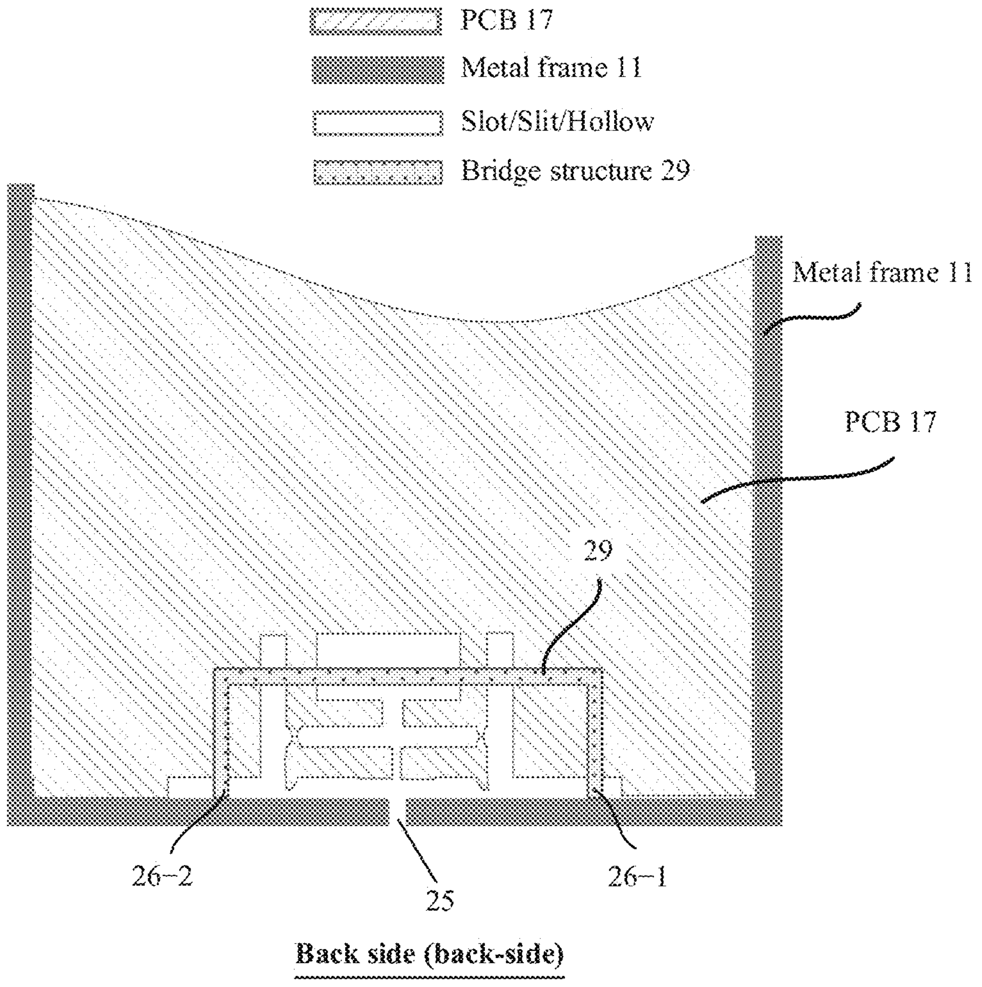
FIG. 12C is a back-side view of a slot antenna according to Embodiment 2.
Figure 12D:
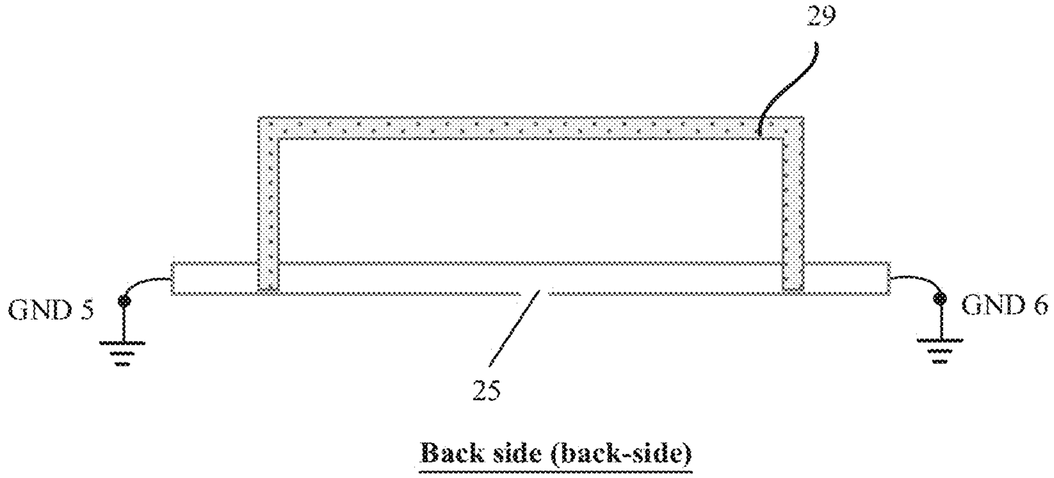
FIG. 12D is a simple diagram of a back-side structure of a slot antenna according to Embodiment 2.

FIG. 12A to FIG. 12D show the slot antenna provided in Embodiment 2. FIG. 12A is a front-side view (front-side view) of the slot antenna. FIG. 12B is a simple diagram of a front-side structure of the slot antenna. FIG. 12C is a back-side view (back-side view) of the slot antenna. FIG. 12D is a simple diagram of a back-side structure of the slot antenna. Herein, a front side is a front side of a PCB 17, and a back side is a back side of the PCB 17. The front-side view shows an anti-symmetrical feeding design of an antenna structure, and a back-side view shows a symmetrical feeding design of the antenna structure.

As shown in FIG. 12A to FIG. 12D, the slot antenna provided in Embodiment 2 may include a slot 21, a feeding point M, and a feeding point N.

Figure 15:
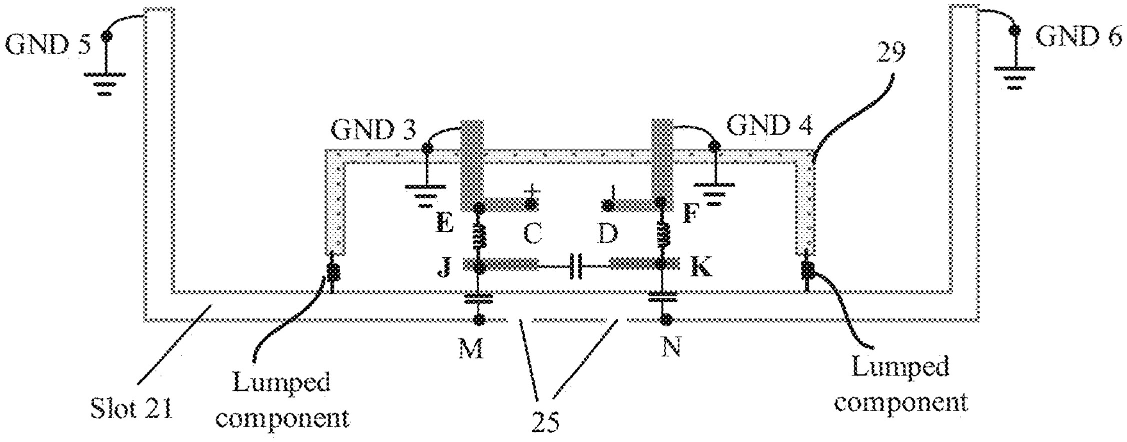
FIG. 15 is an extended implementation of a "bridge" structure according to an embodiment of this application.

The slot 21 may be disposed between the PCB 17 and a first section of a metal frame 11. Different from that in Embodiment 1, the slot 21 in Embodiment 2 is shorter, to form a slot radiator with a smaller size, and generate a medium/high frequency resonance. A length of the slot 21 may be less than a first length (for example, 50 mm). For example, as shown in FIG. 15, the slot 21 may be a strip-shaped slot located at a bottom of an electronic device 10, and a length of the slot 21 is 46 mm.

A slit 25 may be disposed a side edge 23-2 that is of the slot 21 and that includes the metal frame 11. There may be one or more slits 25 on the side edge 23-2. For example, as shown in FIG. 12A, there may be one slit 25. The slit 25 may be disposed at a middle location of the side edge, or may be disposed away from the middle location.

The feeding point M and the feeding point N may be located on the side edge 23-2 that is of the slot 21 and that includes the metal frame 11, and specifically, may be respectively disposed on two sides of the slit 25. In other words, the feeding point M is located on a first part of the side edge 23-2, and the feeding point N is located on a second part of the side edge 23-2.

The same as that in Embodiment 1, the slot antenna provided in Embodiment 2 may further include a bridge structure 29. Different from that in Embodiment 1, the bridge structure 29 in Embodiment 2 may be a U-shaped structure, and two ends of the bridge structure 29 may be respectively connected to parts of the slot that are on the two sides of the slit 25. A first end 26-1 and a second end 26-2 of the bridge structure 29 may be specifically connected to a bottom edge of the metal frame 11.

In Embodiment 2, the anti-symmetrical feeding structure described in Embodiment 1 may be used. For details, refer to Embodiment 1. Details are not described herein again.

A dimension of the slot antenna provided in Embodiment 2 may be as follows: A width of the slot 21 is 1 mm. A width of one slit disposed at a bottom of the metal frame 11 is 2 mm, and lengths of parts of the slot radiator that are on two sides of the slit are both 22 mm.

The following describes a simulation of the slot antenna provided in Embodiment 2 with reference to the accompanying drawings.

Figure 13A:
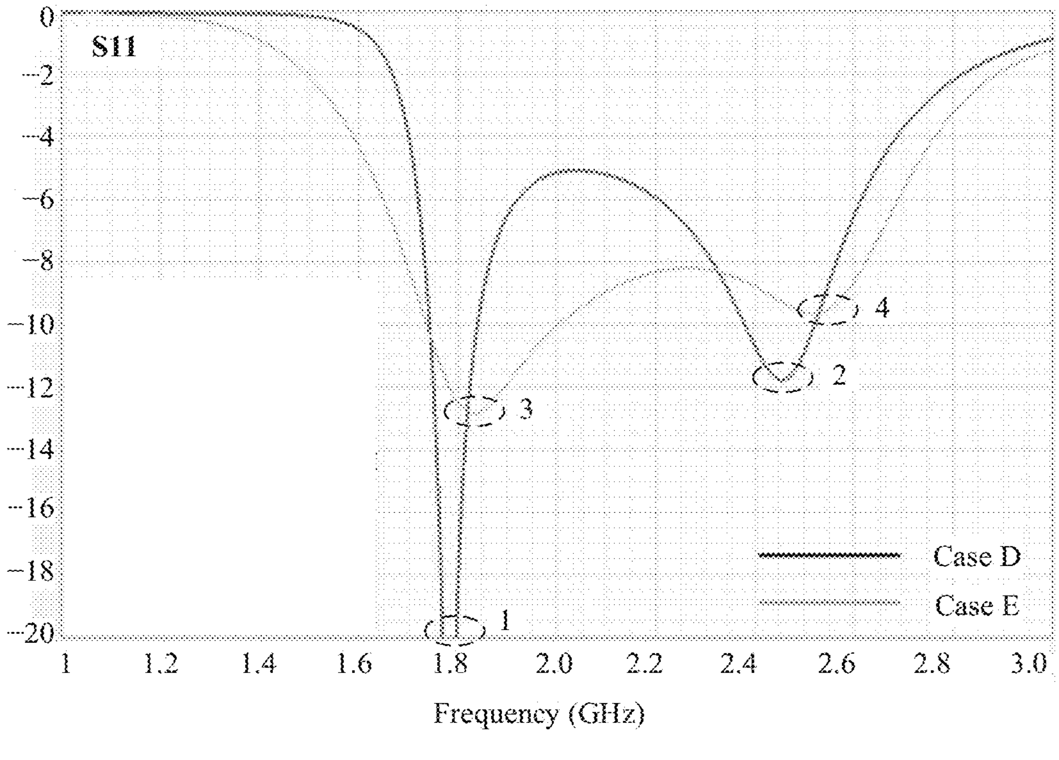
FIG. 13A is a diagram of an S11 simulation of a slot antenna according to Embodiment 2.

FIG. 13A to FIG. 13C(1) and FIG. 13C(2) respectively show a reflection coefficient, a radiation directivity coefficient, and antenna efficiency of the slot antenna provided in Embodiment 2.

FIG. 13A shows a curve of a group of reflection coefficients in a simulation of the slot antenna provided in Embodiment 2. A resonance "1" (1.78 GHz) and a resonance "2" (2.46 GHz) represent two resonances generated by the slot antenna provided in Embodiment 2. Both the resonance "1" and the resonance "2" are generated in the CM slot antenna mode of the slot antenna provided in Embodiment 2. FIG. 13A further shows a comparison between two resonances, namely, a resonance "3" and a resonance "4" generated by the slot antenna shown in FIG. 2A. In addition to frequency bands of 1.78 GHz and 2.46 GHz shown in FIG. 13A, the slot antenna provided in Embodiment 2 may further generate a resonance on another medium/high frequency band, and the resonance on the another low frequency band may be specifically implemented by adjusting a size of the slot antenna.

FIG. 13B(1) and FIG. 13B(2) show radiation patterns of the two resonances of the slot antenna provided in Embodiment 2. A radiation pattern of the resonance "1" (1.78 GHz) is basically the same as a radiation pattern of the resonance "2" (2.46 GHz). In addition, the slot antenna provided in Embodiment 2 has a very low directivity coefficient and a wider pattern coverage on a low frequency band.

FIG. 13C(1) and FIG. 13C(2) show a comparison among efficiency curves of the slot antenna provided in Embodiment 2 in cases of a left hand grip, a right hand grip, and free space in a portrait-mode grip scenario. FIG. 13C(1) and FIG. 13C(2) further show a comparison among efficiency curves of the slot antenna shown in FIG. 2A in cases of a left hand grip, a right hand grip, and free space in a portrait-mode grip scenario. It can be learned that, compared with the slot antenna shown in FIG. 2A, the slot antenna provided in Embodiment 2 has basically same efficiency in cases of the left hand grip and the right hand grip in the portrait-mode grip scenario, and an efficiency value of the efficiency in the cases of the left hand grip and the right hand grip in the portrait-mode grip scenario is approximately between efficiency in a case of the left hand grip and efficiency in a case of the right hand grip of the slot antenna shown in FIG. 2A.

It can be learned from all simulation results shown in FIG. 13A to FIG. 13C(1) and FIG. 13C(2) that, at a medium/high frequency, compared with the slot antenna shown in FIG. 2A, the slot antenna provided in Embodiment 2 has equivalent performance in the cases of the left hand grip and the right hand grip in the portrait-mode grip scenario.

Figure 14:
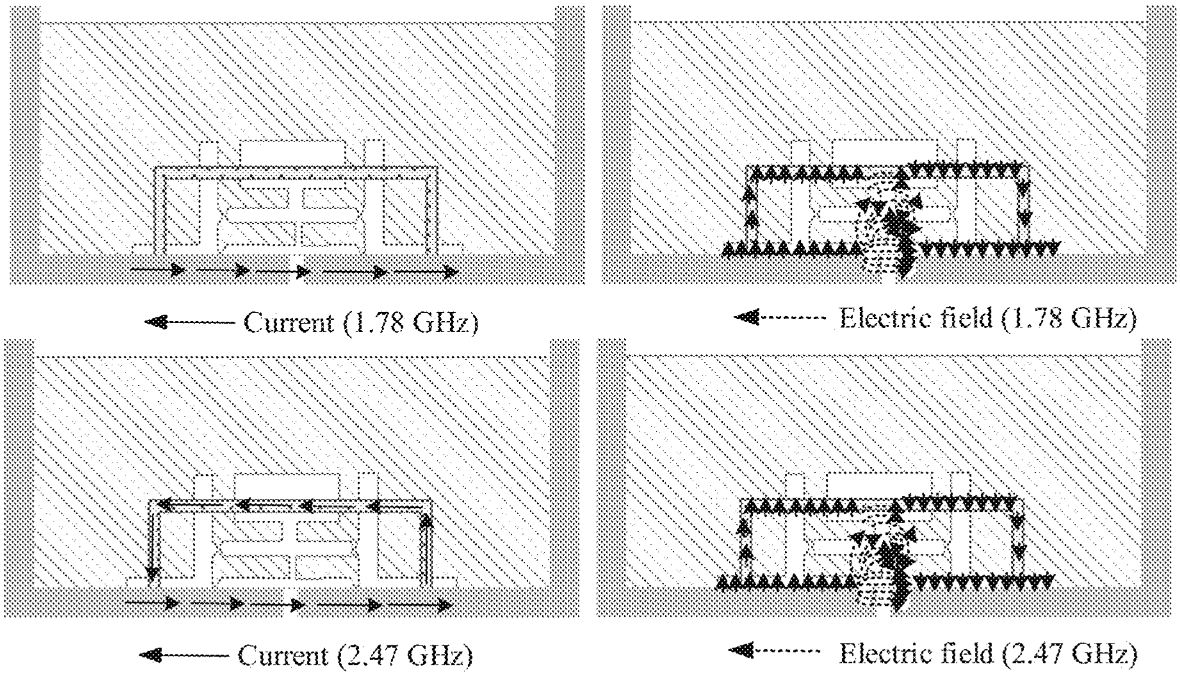
FIG. 14 is a schematic diagram of distributions of a current and an electric field of two resonances of a slot antenna according to Embodiment 2.

FIG. 14 shows distributions of currents and electric fields of two resonances, namely, a current and an electric field of the resonance "1" (1.78 GHz) and a current and an electric field of the resonance "2" (2.46 GHz), of the slot antenna provided in Embodiment 2. It can be learned from FIG. 14 that the current of the resonance "1" (1.78 GHz) is distributed on the metal frame 11 around the bridge structure 29 and the slot 21, and the current of the resonance "2" (2.46 GHz) is distributed on the metal frame 11 around the slot 21. The current of the resonance "1" (0.82 GHz) and the current of the resonance "2" (0.87 GHz) each are distributed in a same direction on the two sides of the middle location of the slot antenna, but each electric field is distributed in opposite directions on the two sides of the middle location of the slot antenna. The currents of the two resonances are both currents in the CM slot antenna mode, and the electric fields of the two resonances are both electric fields in the CM slot antenna mode. The current and the electric field in the CM slot antenna mode are generated when parts of the slot antenna radiator that are on the two sides of the middle location of the slot antenna separately operate in a ¼ wavelength mode: The current is weak at the middle location of the slot antenna, and is strong at two ends of the slot antenna. The electric field is strong at the middle location of the slot antenna, and is weak at the two ends of the slot antenna.

In addition, Table 3 shows an SAR of the electronic device 10 for which the slot antenna provided in Embodiment 2 is used. Table 4 shows an SAR of the electronic device 10 for which the slot antenna shown in FIG. 2A is used. Table 3 and Table 4 show a comparison of performance of the two antenna designs in a case of a low SAR. The comparison is performed when the slot antenna provided in Embodiment 2 and the slot antenna show in in FIG. 2A are both arranged at a bottom of the electronic device 10.

TABLE 3

| SAR | 1.83 GHz | 2.51 GHz |
|---|---|---|
| Back (distance: 5 mm) | 2.32 | 2.38 |
| Bottom (distance: 5 mm) | 2.48 | 2.59 |
| Efficiency normalization (−5 dB) | | |
| Back (distance: 5 mm) | 0.85 | 0.87 |
| Bottom (distance: 5 mm) | 0.91 | 0.95 |

TABLE 4

| SAR | 1.89 GHz | 2.55 GHz |
|---|---|---|
| Back (distance: 5 mm) | 2.49 | 2.96 |
| Bottom (distance: 5 mm) | 2.76 | 3.29 |
| Efficiency normalization (−5 dB) | | |
| Back (distance: 5 mm) | 0.88 | 1.14 |
| Bottom (distance: 5 mm) | 0.98 | 1.26 |

Table 3 and Table 4 show an SAR in a standard of 10 g. It can be learned that when an output power is 24 dB, an entire SAR (an SAR of the back and an SAR of the bottom) of the electronic device 10 for which the slot antenna provided in Embodiment 2 is used is low. When efficiency is normalized to −5 dB, the slot antenna provided in Embodiment 2 has a more obvious advantage in a case of a low SAR. The SAR of the back is measured when a human tissue is 5 mm away from the back of the electronic device, and the SAR of the bottom is measured when the human tissue is 5 mm away from the bottom of the electronic device.

It can be learned that, in the antenna design solution provided in Embodiment 2, two medium/high frequency (an operating frequency band is near 2.4 GHz Wi-Fi) CM slot antenna modes of one short slot antenna radiator may be separately excited through symmetrical feeding and anti-symmetrical feeding. When dual resonances and wideband coverage are implemented, performance in a case of the left hand grip and performance in a case of the right hand grip are equivalent, and SAR values in the two modes are close.

In the foregoing embodiment, the feeding point M and the feeding point N may be respectively referred to as a first feeding point and a second feeding point.

Figure 17A:
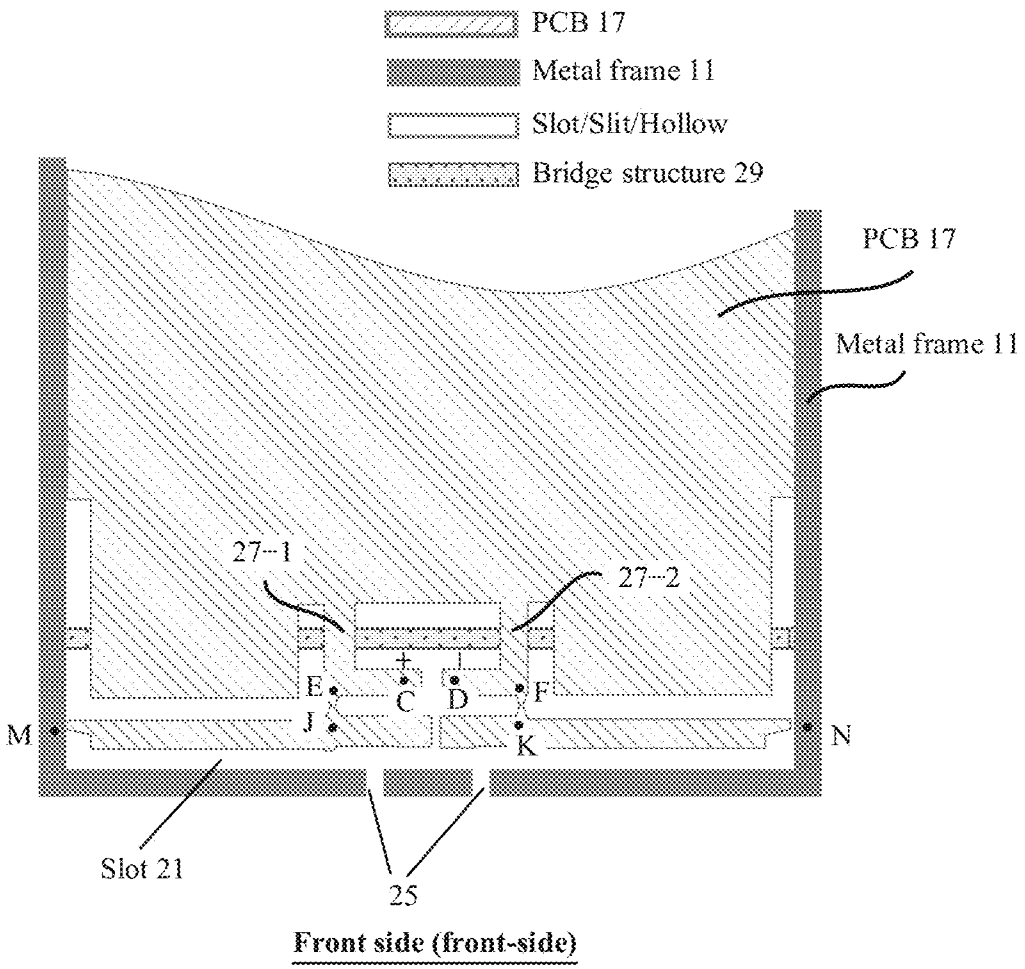
FIG. 17A is a front-side view of another slot antenna according to an embodiment of this application.
Figure 17B:
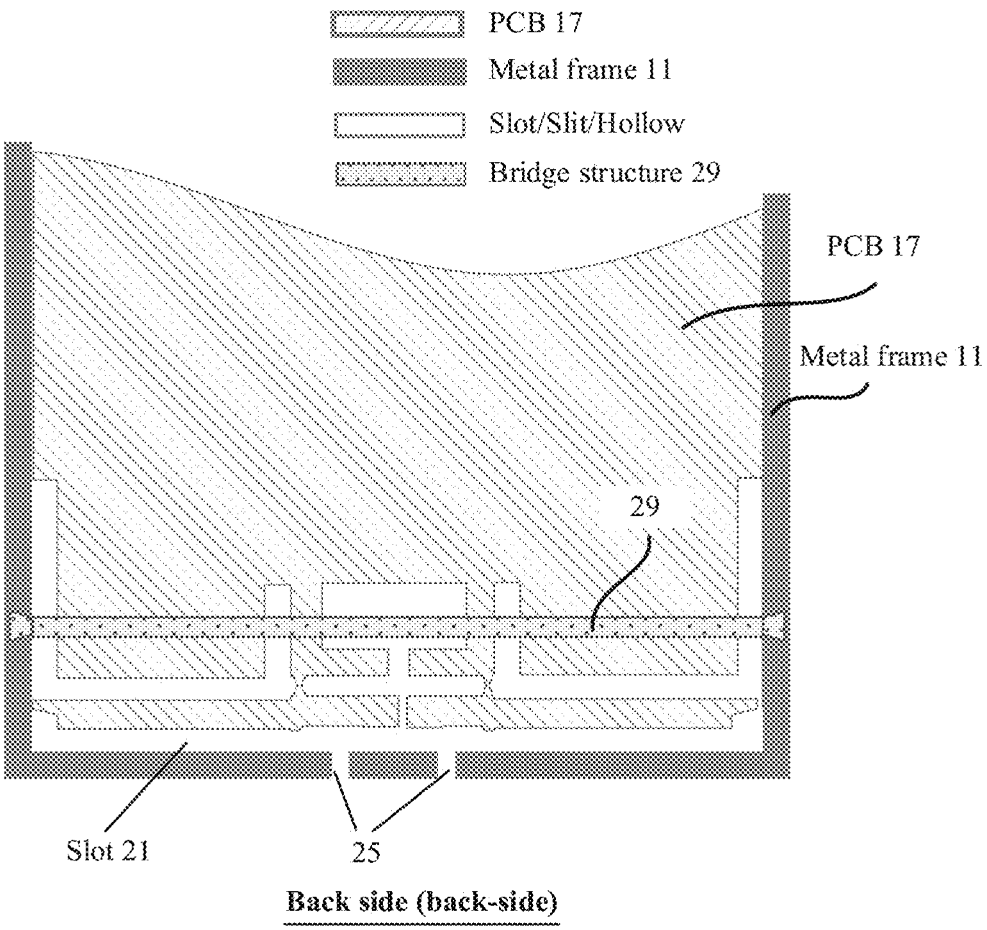
FIG. 17B is a back-side view of another slot antenna according to an embodiment of this application.

In the foregoing embodiment, the feeding point M and the feeding point N are not limited to being disposed close to the slit, but the feeding point M and the feeding point N may alternatively be respectively disposed close to two ends of the slot 21, as shown in FIG. 17A and FIG. 17B.

In the feeding structure in the foregoing embodiment, the "bridge" structure (namely, the bridge structure 29) has a large size, and some lumped components (for example, a lumped inductor) may be added to reduce the size, as shown in FIG. 15. The "bridge" structure is not limited to the bridge structure 29, but may alternatively be formed by hollowing out the ground plane of the PCB.

Figure 16:
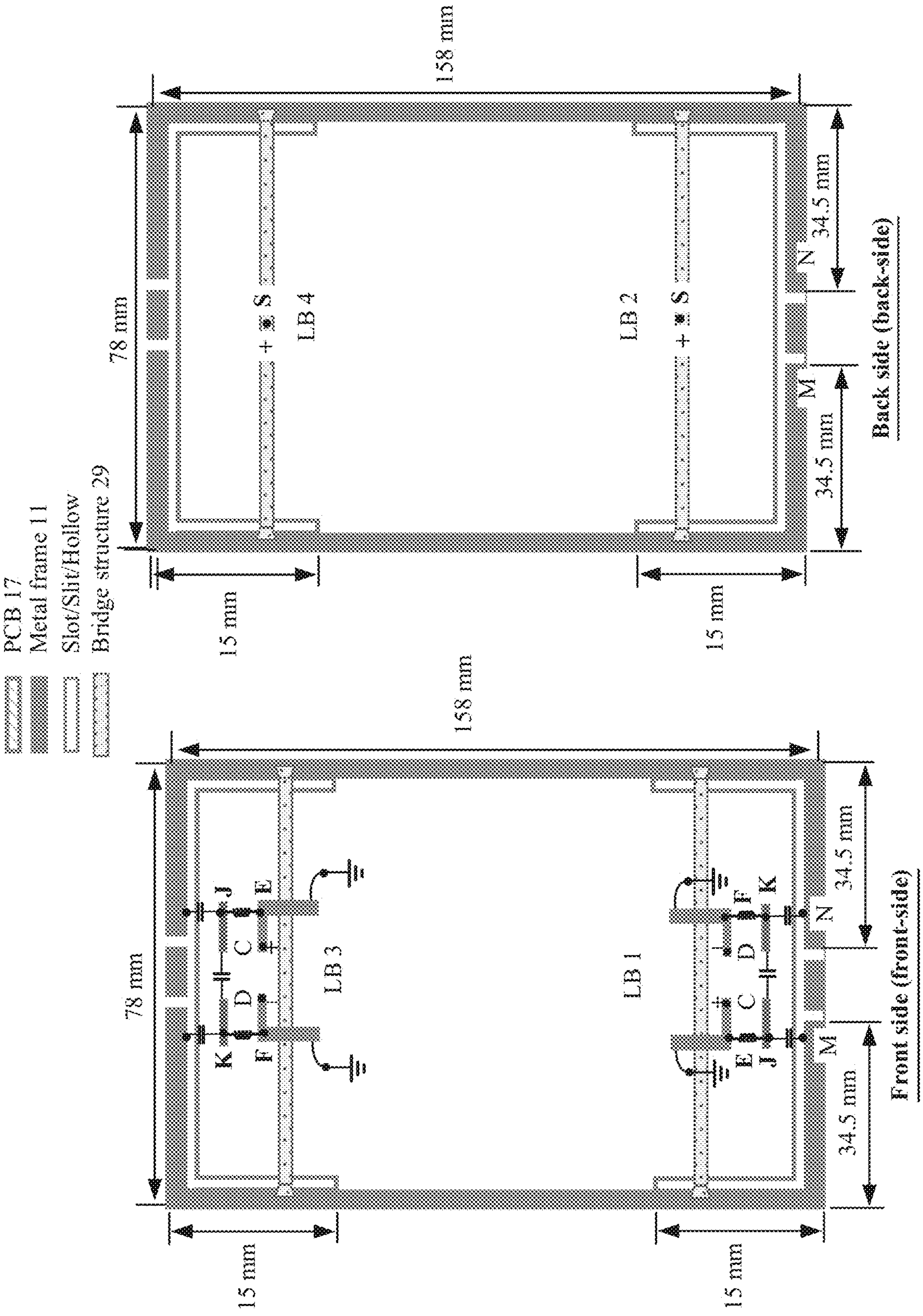
FIG. 16 is a schematic diagram of a 4*4 MIMO antenna according to an embodiment of this application.

The slot antenna provided in the foregoing embodiment is not limited to being arranged at the bottom of the electronic device 10, but may alternatively be arranged at a top or on a side edge of the electronic device 10, as shown in FIG. 16. It can be learned that, compared with a conventional MIMO antenna, such a slot antenna on which dual feeding is performed by using a shared radiator and that is provided in this embodiment of this application may be used to save much space when a 4*4 MIMO antenna is implemented.

The antenna design solution provided in the foregoing embodiment is not limited to being implemented in an electronic device with a metal frame ID. The metal frame is merely a name. Another conductive structure surrounding the PCB 17, for example, a metal middle frame, may also be used as the metal frame in the foregoing embodiment. The slot 21 may alternatively include the metal middle frame and the PCB 17.

In an actual application, a structure of the electronic device usually cannot be completely symmetrical, and a connection location of a matching network, the "bridge" structure, or the like can be adjusted, to compensate for an imbalance of the structure.

In this application, a wavelength in a wavelength mode (for example, a half-wavelength mode or a quarter-wavelength mode) of an antenna may be a wavelength of a signal radiated by the antenna. For example, a half-wavelength mode of the antenna may generate a resonance on a frequency band of 2.4 GHz, and a wavelength in the half-wavelength mode is a wavelength at which the antenna radiates a signal on the frequency band of 2.4 GHz. It should be understood that a wavelength of a radiation signal in the air may be calculated as follows: Wavelength=Speed of light/Frequency, where the frequency is a frequency of the radiation signal. A wavelength of the radiation signal in a medium may be calculated as follows: Wavelength=(Speed of light/$\sqrt{\varepsilon}$)/Frequency. Herein, $\varepsilon$ is a relative dielectric constant of the medium, and the frequency is a frequency of the radiation signal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising:
a printed circuit board (PCB);
a metal frame comprising a section;
a slot antenna, wherein the slot antenna comprises:
- a slot between the PCB and the section of the metal frame, wherein the slot comprises:
  - two ends that are grounded;
  - a first side edge comprised of a side edge part of the PCB; and
  - a second side edge comprised of the section, wherein the second side edge comprises:
    - a first part; and
    - a second part;
- a slit on the second side edge, wherein the first part is on a first side of the slit and the second part is on a second side of the slit;
- a first feeding point on the first part;
- a second feeding point on the second part;

a feeding source comprising a positive electrode coupled to the first feeding point and a negative electrode coupled to the second feeding point; and a bridge structure comprising:

a first end coupled to the first part; and a second end coupled to the second part; and a feeding network, wherein the first feeding point and the second feeding point are coupled to the feeding network, and wherein the feeding network comprises two symmetrical parallel conducting wires that are comprised of hollowed-out portions of a ground plane of the PCB that extend from the ground plane.

2. The electronic device according to claim 1, wherein the slot is one of a U-shaped slot, a strip-shaped slot, or an L-shaped slot.

3. The electronic device according to claim 1, wherein the slot antenna is at a bottom of the electronic device, a top of the electronic device, or a side edge of the electronic device.

4. The electronic device according to claim 1, further comprising a coaxial transmission line that comprises an inner conductor and an outer conductor, wherein the first feeding point and the second feeding point are respectively coupled to the positive electrode and the negative electrode of the feeding source by the coaxial transmission line, wherein the first feeding point is coupled to the inner conductor, and wherein the second feeding point is coupled to the outer conductor.

5. An electronic device, comprising:

a printed circuit board (PCB);

a metal frame, wherein the metal frame comprises:

a section;

a first end;

a second end; and an antenna apparatus, wherein the antenna apparatus comprises:

a slot between the PCB and the section of the metal frame, wherein the slot comprises:

two ends that are grounded;

a first side edge comprised of a side edge part of the PCB;

a second side edge comprised of the section, wherein the second side edge comprises:

a first part;

a second part; and a third part comprising:

a third side, wherein the first part is on the third side;

a fourth side, wherein the second part is on the fourth side;

a first slit;

a second slit; and a floating section between the first slit and the second slit;

a first feeding point on the first part;

a second feeding point on the second part;

a feeding source comprising a positive electrode coupled to the first feeding point and a negative electrode coupled to the second feeding point; and a bridge structure comprising:

a third end; and a fourth end, wherein the third end is coupled to the first part and the fourth end is coupled to the second part.

6. The electronic device according to claim 5, wherein the bridge structure is further coupled to the floating section.

7. The electronic device according to claim 6, wherein the bridge structure comprises a T-shaped structure, and wherein the T-shaped structure comprises:

a transverse branch; and a vertical branch, wherein two ends of the transverse branch are respectively the third end and the fourth end that are respectively coupled to the first part and the second part, and wherein the vertical branch is coupled to the floating section.

8. The electronic device according to claim 5, further comprising a feeding network, wherein the first feeding point and the second feeding point are coupled to the feeding network, and wherein the feeding network comprises two symmetrical parallel conducting wires that are comprised of hollowed-out portions of a ground plane of the PCB that extend from the ground plane.

9. The electronic device according to claim 5, wherein the slot is one of a U-shaped slot, a strip-shaped slot, or an L-shaped slot.

10. The electronic device according to claim 5, wherein the antenna apparatus is at a bottom of the electronic device, a top of the electronic device, or a side edge of the electronic device.

11. The electronic device according to claim 5, further comprising a coaxial transmission line that comprises an inner conductor and an outer conductor, wherein the first feeding point and the second feeding point are respectively coupled to the positive electrode and the negative electrode of the feeding source by the coaxial transmission line, wherein the first feeding point is coupled to the inner conductor, and wherein the second feeding point is coupled to the outer conductor.

12. An electronic device comprising:

a printed circuit board (PCB);

a metal frame comprising a section;

an antenna apparatus comprising:

a slot between the PCB and the section of the metal frame, wherein the slot comprises:

two ends that are grounded;

a first side edge comprised of a side edge part of the PCB; and a second side edge comprised of the section, wherein the second side edge comprises:

a first part; and a second part;

a first feeding point on the first part;

a second feeding point on the second part;

a feeding source comprising a positive electrode coupled to the first feeding point and a negative electrode coupled to the second feeding point; and a bridge structure comprising:

a first end coupled to the first part; and a second end coupled to the second part; and a feeding network coupled to the first feeding point and the second feeding point and comprising two symmetrical parallel conducting wires that are comprised of hollowed-out portions of a ground plane of the PCB that extend from the ground plane.

13. The electronic device according to claim 12, wherein the antenna apparatus is a slot antenna that further comprises a slit on the second side edge, and wherein the first part is on a first side of the slit and the second part is on a second side of the slit.

14. The electronic device according to claim 12, wherein the second side edge further comprises a third part comprising:

a third side, wherein the first part is on the third side;

a fourth side, wherein the second part is on the fourth side;

a first slit;

a second slit; and a floating section between the first slit and the second slit, wherein the bridge structure is further coupled to the floating section.

15. The electronic device according to claim 12, wherein the slot is a strip-shaped slot.

16. The electronic device according to claim 12, wherein the slot is an L-shaped slot.

17. The electronic device according to claim 12, wherein the antenna apparatus is at a top of the electronic device.

18. The electronic device according to claim 12, further comprising a coaxial transmission line that comprises an inner conductor and an outer conductor, wherein the first feeding point is coupled to the inner conductor, and wherein the second feeding point is coupled to the outer conductor.

19. The electronic device according to claim 18, wherein the first feeding point and the second feeding point are respectively coupled to the positive electrode and the negative electrode of the feeding source by the coaxial transmission line.

* * * * *